United States Patent
Shajii et al.

(10) Patent No.: US 12,474,908 B2
(45) Date of Patent: Nov. 18, 2025

(54) SYSTEMS AND METHODS FOR ENHANCING EXECUTION OF INTERPRETED COMPUTER LANGUAGES

(71) Applicant: Exaloop, Inc., Brookline, MA (US)

(72) Inventors: Ariya Shajii, Weston, MA (US); Ibrahim Numanagić, Victoria (CA)

(73) Assignee: Exaloop, Inc., Brookline, MA (US)

( * ) Notice: Subject to any disclaimer, the term of this patent is extended or adjusted under 35 U.S.C. 154(b) by 134 days.

(21) Appl. No.: 18/457,724

(22) Filed: Aug. 29, 2023

(65) Prior Publication Data

US 2024/0078100 A1 Mar. 7, 2024

Related U.S. Application Data

(60) Provisional application No. 63/403,350, filed on Sep. 2, 2022.

(51) Int. Cl.
G06F 8/41 (2018.01)

(52) U.S. Cl.
CPC .............. *G06F 8/447* (2013.01); *G06F 8/42* (2013.01); *G06F 8/443* (2013.01)

(58) Field of Classification Search
CPC ............ G06F 8/447; G06F 8/42; G06F 8/443
See application file for complete search history.

(56) References Cited

U.S. PATENT DOCUMENTS

| | | | | |
|---|---|---|---|---|
| 2005/0278697 | A1* | 12/2005 | Hodge | G06F 8/315 717/115 |
| 2014/0331201 | A1* | 11/2014 | Adl-Tabatabai | G06F 8/30 717/106 |
| 2016/0306896 | A1* | 10/2016 | Paradies | G06F 16/90335 |
| 2017/0308364 | A1  | 10/2017 | Munshi et al. | |
| 2021/0073375 | A1  | 3/2021  | Milburn et al. | |
| 2021/0248115 | A1  | 8/2021  | Jones et al. | |
| 2021/0389935 | A1* | 12/2021 | Bansal | G06F 8/443 |

FOREIGN PATENT DOCUMENTS

| | | | | |
|---|---|---|---|---|
| CN | 105335135 A | * | 2/2016 | ............ G06F 9/44 |
| CN | 106126312 A | * | 11/2016 | ............ G06F 8/443 |

OTHER PUBLICATIONS

International Search Report and Written Opinion dated Nov. 17, 2023, in connection with International Application No. PCT/US23/31388.

* cited by examiner

*Primary Examiner* — Phillip H Nguyen
(74) *Attorney, Agent, or Firm* — Wolf, Greenfield & Sacks, P.C.

(57) ABSTRACT

Systems and methods are provided that incorporate a compiler configured to convert interpreted language code (e.g., Python) into native machine code. According to some embodiments, the system generates the native machine code into a format that is consistent with known infrastructure. The native machine code can be converted into a format based on a low level virtual machine "LLVM" infrastructure. In various embodiments, the system enables a compiler framework that improves execution of code for interpreted languages. According to one embodiment, the system can be tailored for execution on specific processors, for example, a graphics processing unit ("GPU") that is optimized for highly parallel computations.

20 Claims, 22 Drawing Sheets

```
// C++
#pragma omp parallel for schedule(dynamic, 10) num_threads(8)
for (int i = 0; i < N; i++) c[i] = a[i] + b[i];
```

```
# Codon
@par(schedule='dynamic', chunk_size=10, num_threads=8)
for i in range(N): c[i] = a[i] + b[i]
```

```
import openmp as omp
def f(a, b, c, i):
    c[i] = a[i] + b[i]
def g(loop, a, b, c): omp_dynamic_init(loop=loop, chunk=10) while True:
    more, subloop = omp_dynamic_next(loop)
    if not more: break
    for i in subloop: f(a, b, c, i) omp_push_num_threads(8) omp_fork_call(g, range(N), a, b, c)
```

FIG. 9

```
(* OCaml *)
let f g a b = (g a, g b) in
let g x = x in
f g 1 "a" (* error *)
```

```
# Python
def f(g, a, b): return g(a), g(b)
def g(x): return x
f(g, 1, "a")  # compiles
```

```
def flatten(v):
    for a in v:
        if hasattr(type(a), "__getitem__"):
            yield from flatten(a)
        else:
            yield a v = (1, [2, 3], ([4], [5]))
print(list(flatten(v))) # [1, 2, 3, 4, 5]
```

FIG. 14

```
def group(items):
    groups = {}
    for key,value in items:
        groups.setdefault(key, []).append(value)
    return groups items = [('a', 3), ('b', 5), ('a', 7)]
print(group(items)) # {a: [3, 7], b: [5]}
```

|  | LLVM equivalent | Examples |
|---|---|---|
| Node | N/A | See below |
| Module | Module | N/A |
| Type | Type | IntType, FuncType, RecordType |
| Var | AllocaInst | Var, Func |
| Func | Function | BodiedFunc, LLVMFunc, ExternalFunc |
| Value | Value | See below |
| Const | Constant | IntConst, FloatConst, StringConst |
| Instr | Instruction | CallInstr, TernaryInstr, ThrowInstr |
| Flow | Various | IfFlow, WhileFlow, ForFlow |

Table 1. CIR structure

FIG. 16

```
@extend
class int:
    @llvm
    def __add__(self, b: int) -> int:
        %tmp = add i64 %self, %b
        ret i64 %tmp
```

```
def fib(n):
    if n < 2:
        return 1
    else:
        return fib(n - 1) + fib(n - 2)
```

```
(bodied_func
  "fib[int]"
  (type "fib[int]")
  (args (var "n" (type "int")) (global false))
  (vars)
  (series
    (if (call "int_lt_[int,int]" "n" 2)
      (series (return 1))
      (series
        (return
          (call
            "int_add_[int,int]"
            (call
              "fib[int]"
              (call "int_sub_[int,int]" "n" 1))
            (call
              "fib[int]"
              (call "int_sub_[int,int]" "n" 2))))))))
```

FIG. 19

```
class AddFolder : public OperatorPass {
    void handle(CallInstr *v) {
        auto *f = util::getFunc(v->getCallee());
        if (!f || f->getUnmangledName() != "__add__") return;
        auto *lhs = cast<IntConst>(v->front());
        auto *rhs = cast<IntConst>(v->back());
        if (lhs && rhs) {
            auto sum = lhs->getVal() + rhs->getVal();
            v->replaceAll(v->getModule()->getInt(sum));
        }
    }
};
```

FIG. 20

```
def foo(x): return x*3 + x def validate(x, y):
    assert y == x*4 a = foo(10)
b = foo(1.5)
c = foo('a')
```

```
a = foo(10)
validate(10, a)

b = foo(1.5)
validate(1.5, b)

c = foo('a')
validate('a', c)
```

```
class ValidateFoo : public OperatorPass {
  void handle(AssignInstr *v) {
    auto *M = v->getModule();
    auto *var = v->getLhs();
    auto *call = cast<CallInstr>(v->getRhs());
    if (!call) return;
    auto *foo = util::getFunc(call->getCallee());
    if (!foo || foo->getUnmangledName() != "foo") return;
    auto *arg1 = call->front(); // argument of 'foo' call
    auto *arg2 = M->Nr<VarValue>(var); // result of 'foo' call
    auto *validate = M->getOrRealizeFunc("validate",
                        {arg1->getType(), arg2->getType()});
    auto *validateCall = util::call(validate, {arg1, arg2});
    insertAfter(validateCall); // call 'validate' after 'foo'
  }
};
```

FIG. 21

```
class Builder : public TypeBuilder {
  llvm::Type *buildType(LLVMVisitor *v) {
    return v->getBuilder()->getFloatTy();
  } llvm::DIType *buildDebugType(LLVMVisitor *v) {
    auto *module = v->getModule();
    auto &layout = module->getDataLayout();
    auto &db = v->getDebugInfo();
    auto *t = buildType(v);
    return db.builder->createBasicType(
           "float_32",
           layout.getTypeAllocSizeInBits(t),
           llvm::dwarf::DW_ATE_float);
  }
};

class Float32 : public CustomType {
  unique_ptr<TypeBuilder> getBuilder() const {
    return make_unique<Builder>();
  }
};
```

FIG. 22

```
Algorithm 1: Type checking of a function F.
   Result: LTSDI(F)
 1  F^ret ← UnrealizedType();
 2  foreach s ∈ F do                              // iterate over statements
 3  |   foreach e ∈ s do                          // iterate over expressions
 4  |   |   e_type ← UnrealizedType();
 5  |   end
 6  end
 7  T ← {(e, e_type) | e ∈ s, ∀s ∈ F};
 8  loop
 9  |   T_0 ← T;
10  |   foreach s ∈ F do                          // iterate over statements
11  |   |   foreach e ∈ s do                      // iterate over expressions
12  |   |   |   if Realized(e_type) then
13  |   |   |   |   if Returned(e) then
14  |   |   |   |   |   Unify(e_type, F^ret);
15  |   |   |   |   end
16  |   |   |   else
17  |   |   |   |   e_type ← TypeCheck(e);
18  |   |   |   end
19  |   |   end
20  |   T ← {(e, e_type) | e ∈ s, ∀s ∈ F};
21  |   if ⋀_{(e,t)∈T} Realized(t) then
22  |   |   return
23  |   else if T == T_0 then                     // check change in types
24  |   |   error                                 // type checking error
25  end
```

FIG. 23

Algorithm 2: Type checking of a *call*-expression $e = (\mathcal{F}, a_1, \ldots, a_n)$ for called function $\mathcal{F}$ and argument expressions $a_1, \ldots, a_n$.

Result: $\text{TypeCheck}_{\text{call}}(e)$ 1   foreach $a_i \in \{a_1, \ldots, a_n\}$ do
2       $t \leftarrow \text{TypeCheck}(a_i)$;
3       if $\neg\text{Unify}(t, \mathcal{F}_i^{\text{arg}})$ then
4           unified $\leftarrow 0$;
5           foreach $\xi \in \mathcal{X}$ do
6               $a'_i \leftarrow \xi(a_i)$;
7               $t' \leftarrow \text{TypeCheck}(a'_i)$;
8               if $\text{Unify}(t', \mathcal{F}_i^{\text{arg}})$ then
9                   unified $\leftarrow 1$;
10                   break
11               end
12           end
13           if unified $= 0$ then
14               error
15           end
16       end
17 end
18 if $\bigwedge_{a \in \{a_1, \ldots, a_n\}} \text{Realized}(a_{\text{type}})$ then
19       $\text{LTSDI}(\mathcal{F})$;
20       return $\mathcal{F}^{\text{ret}}$
21 end

FIG. 24

SYSTEMS AND METHODS FOR ENHANCING EXECUTION OF INTERPRETED COMPUTER LANGUAGES

RELATED APPLICATIONS

This application claims priority under 35 U.S.C. § 119 to U.S. Provisional Application Ser. No. 63/403,350, entitled "SYSTEMS AND METHODS FOR ENHANCING EXECUTION OF INTERPRETED COMPUTER LANGUAGES," filed Sep. 2, 2022, which application is incorporated herein by reference in its entirety.

COPYRIGHT NOTICE

At least a portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many computer languages exist that can be used to program almost any task. Each language comes with its own unique set of constraints. For example, C and C++ are often thought of as efficient in execution, however the programming tasks are viewed as difficult and complex. Maintaining C and C++ often poses many challenges. Other computer languages may be easier to code, but suffer from efficiency problems in execution. For example, Python and Ruby are "interpreted" languages that use software called interpreters to execute high-level source code. This is unlike C and C++ where source code is compiled into an executable then run.

SUMMARY

According to one aspect, the systems and methods incorporate a compiler configured to convert interpreted language code (e.g., Python) into native machine code. According to some embodiments, the system generates the native machine code into a format that is consistent with known infrastructure. According to one example, the native machine code can be converted into a format based on a low level virtual machine "LLVM" infrastructure. In various embodiments, the system enables a compiler framework that improves execution of code based on interpreted languages. According to one embodiment, the system can be tailored for execution on specific processors, for example, a graphics processing unit ("GPU") that is optimized for highly parallel computations.

According to some embodiments, the system can execute a compilation pipeline on interpreted language source code. The code can be parsed to create an abstract syntax tree ("AST"), described in greater detail below. As part of the pipeline, the system can execute type checking to ascertain the data types of all nodes in the abstract syntax tree. In one example, the approach improves over known typing work (e.g., Hindley-Milner "HM" algorithm) and enables operation on interpreted language code (e.g., Python code). Improvements over HM are able to facilitate aspects of dynamic languages' dynamic/duck typing in a static type system, and include automatic conversions between data types, as well as deferring concrete instantiations of generic data types as much as possible. Introducing type checking improves over conventional implementation of interpreted languages. For example, Python does not do any ahead-of-time type checking and instead defers dealing with types until the code is executed. Because the system analyzes and evaluates all types beforehand, the system can compile its representations to native code similar to C or C++ approaches. Type checking catches various errors early, and once compiled, the converted code executes with greater performance.

In some embodiments, the typed AST is converted to an intermediate representation ("IR"), which is tuned for analyses, transformations, and optimizations, and improves capability over the AST. The system can implement various compiler passes including constant folding, dead code elimination, inlining/outlining, dataflow analysis, among other examples. The compiler passes can be configurable to include customization for domain specific optimizations. According to various embodiments, the compilation pipeline enables a variety of optimizations on interpreted source code.

According to one embodiment, the system and/or functionality can be implemented as "Codon," a domain-extensible compiler framework that offers Python-like syntax, semantics and modules with zero runtime overhead, achieving the performance of C/C++. Various embodiments of "Codon" are described herein. The functionality of any one embodiment or example can be used in conjunction with functionality of other examples. For example, Codon is configured to use a specialized type checking algorithm to statically compile Python programs and leverage a novel intermediate representation to seamlessly incorporate domain-specific optimizations. In further embodiments, the Codon framework is extensible via a plugin architecture, allowing new analyses, optimizations, and even keywords to be easily integrated. Various examples and embodiment, including various functions and/or algorithms are discussed with respect to the Codon framework, and should be understood to be usable separately, as a stand-alone system, in various combination, whether the operations, functions, and/or architecture is described with reference to Codon or more generically as a system or system component.

Various embodiments enable optimizations and transformations via the compiler pipeline. For example, the system enables interpreted language optimizations, Python-specific optimizations, domain-specific optimizations, backend-specific optimizations, including backends for parallel processing or GPUs which can include tailored sets of transformations and/or optimizations. According to one embodiment, the system is configured to use a parallel processing architecture (e.g., OpenMP backend) for parallel processing, and the system is configured to execute program transformations for optimizing the interface with the parallel processing architecture.

In further embodiments, the intermediate representation is converted to an LLVM formatted IR. Example conversions include, a Codon/Python "int" becomes an LLVM IR 64-bit integer "i64," and a "float" becomes an LLVM IR 64-bit floating point type "double." Other conversions require the system to tailor the conversion to allow the system to work correctly and efficiently. For example, tuple types in the high-level language become structure types in LLVM IR whose element types have been recursively converted, and exception handling in the high-level language is handled using the low-level Itanium C++ ABI. Once converted the system can leverage a LLVM optimization pipeline (e.g., similar to "-O3" on a C compiler), which may be used in conjunction with system specific LLVM passes that target system specific constructs and patterns. The final LLVM IR is then converted to native code for the desired target, be it as an executable, object file, shared library or another computer object. The generated native code can either be saved in standard formats for execution or executed immediately. Execution proceeds by simply running the generated code, which is linked to a lightweight runtime library, which can include, for example, dynamic memory allocation, I/O, OS interfacing among other facilities. The result of the transformation via the compiler pipeline is the resulting code that operates with 100-1000× performance improvement, with opportunity for even greater performance with parallelism.

According to one aspect, a system for compiling interpreted language code is provided. The system comprises at least one processor; a memory operatively coupled to the at least one processor; the at least one processor when executing configured to: accept interpreted language ("IL") code; transform the IL code into a first representation, the first representation comprising an abstract syntax tree; validate data type specification in the IL code; transform the first representation into an intermediate representation ("IR") in response to validation; optimize the IR based on backend specific optimizations, wherein the backend specific optimizations include hardware specific optimization targets; transform the intermediate representation into a low level virtual machine intermediate representation ("LLVM IR"); and convert the LLVM IR into an executable comprising compiled code.

According to various embodiments, the IR is lower level than an abstract syntax tree or plain source code, but higher level than LLVM—where LLVM reduces most things to raw pointers, GOTOs etc. and the IR (e.g., Codon IR) preserves concepts including for-loops or other control-flow. The Codon IR enables additional optimizations, e.g., Python-specific pattern optimizations, since these conditions are much more difficult to detect in LLVM. According to one embodiment, the hardware specific optimization targets include optimizing the executable for running on a graphics processing unit, field programmable gate array, or tensor processing unit. According to one embodiment, the system is further configured to construct a central processing unit ("CPU") specific code representation and a hardware specific code representation from the LLVM IR. According to one embodiment, the system is further configured to generate the hardware specific code representation based on executing operations configured to remove CPU specific operations or remap functions specified into GPU functions.

According to one aspect, a system for compiling Python code to heterogeneous machine code for a host central processing unit (CPU) and one or more other computing devices, the system comprises, at least one processor operatively connected to a memory, the at least one processor configured to construct a representation of Python code, partition the representation of the Python code in order to generate machine code for multiple heterogeneous targets, including a central processing unit ("CPU"), and at least one other target selected from a GPU, FPGA, and TPU, and generate an executable for running on the CPU, a shared library referenced by the executable for interfacing the CPU with the at least one other target, and code specific to the at least one other target. According to one embodiment, the at least one processor is configured to automatically manage data transfer between the CPU and the at least one other target.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 9 illustrates example code transformations, according to one embodiment;

FIG. 11 illustrates examples issues, according to one embodiment;

FIG. 13 shows an example code snippet, according to one embodiment;

FIG. 14 shows an example bidirectionality operation on example code, according to one embodiment;

FIG. 16 is an example listing of data structure elements, according to one embodiment;

FIG. 19 shows an example source mapping into an intermediate representation, according to one embodiment;

FIG. 20 illustrate an example folding optimization, according to one embodiment;

FIG. 21 illustrates execution of more complex passes, according to one embodiment;

FIG. 22 shows an example of API, according to one embodiment; and

FIGS. 23 and 24 show example algorithms, according to one embodiment.

DETAILED DESCRIPTION

Figure 1:
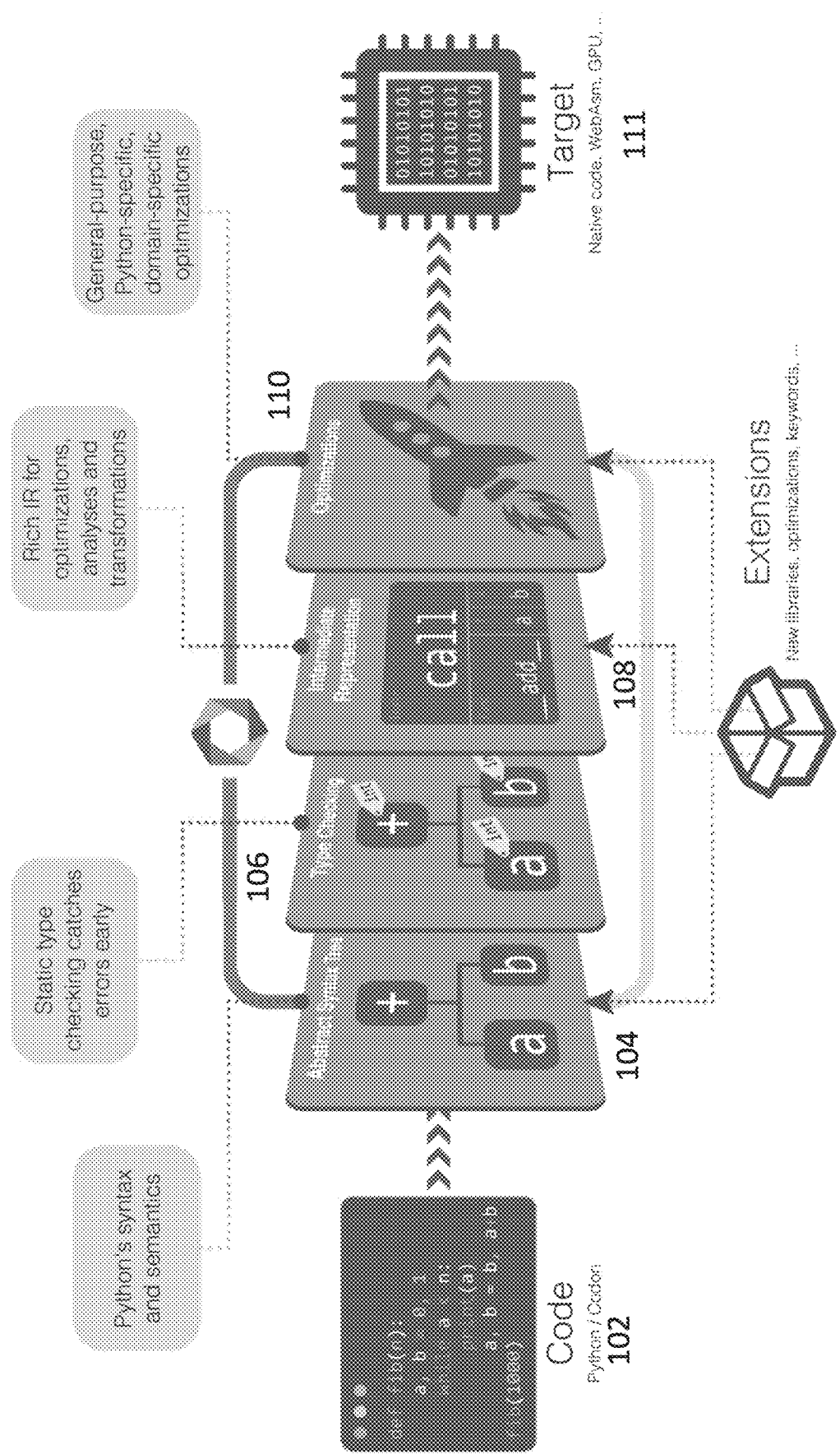
FIG. 1 is a block diagram of a compilation pipeline, according to one embodiment.

According to various embodiments, the system is configured to execute a compiler that converts interpreted code (e.g., Python code) to native machine code based on conversion into an AST format, one or more IR formats, and including optimization of the converted formats. According to one embodiment, the compiler pipeline can be further optimized based on tailoring to a processing environment. For example, the system can tailor the compiler pipeline when the resulting native code is to be executed by a GPU. According to one embodiment, the system is configured to tailor GPU executables to leverage GPU capability for massively parallel computation. According to some embodiments, the system can implement a domain-extensible compiler and DSL framework for high-performance domain specific languages ("DSLs") with Python's syntax and semantics.

Various embodiments employ ahead-of-time type checking and compilation of Python programs, and leverage novel intermediate representations to easily incorporate domain-specific optimizations and analyses. Examples include several compiler extensions and DSLs to target various domains, including bioinformatics, secure multi-party computation, block-based data compression and parallel programming. The examples illustrate the benefits of allowing familiar high-level languages while achieving performance typically only seen with low-level languages, enabling the system to bridge the gap between performance and usability.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element, or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 is an example block diagram of a compilation pipeline 100, that can be executed by the system. The pipeline 100 shown in FIG. 1 can begin at 102 with code written in an interpreted language. The interpreted code (e.g., Python code) is transformed into an abstract syntax tree ("AST") 104. An abstract syntax tree (AST) is a tree representation of the abstract syntactic structure of text (often source code) written in a formal language. Each node of the tree denotes a construct occurring in the text. The syntax is "abstract" in the sense that it does not represent every detail appearing in the real syntax, but rather represents the structural or content-related details.

At 106 static type checking is executed to catch errors early in the pipeline. Once reviewed, an intermediate representation can be generated at 108. The intermediate representations can be analyzed for optimization, reformatted to facilitate analysis and transformation and subsequent executables. Optimizations can be applied to the representations of the code at 110. The optimizations can include language specific optimizations (e.g., Python), domain specific optimizations, backend processing optimizations (e.g., parallel processing), among other options. The output of the pipeline is native code 111 that can be executed with performance improvement on the order of 100 to 1000 times.

Figure 2:
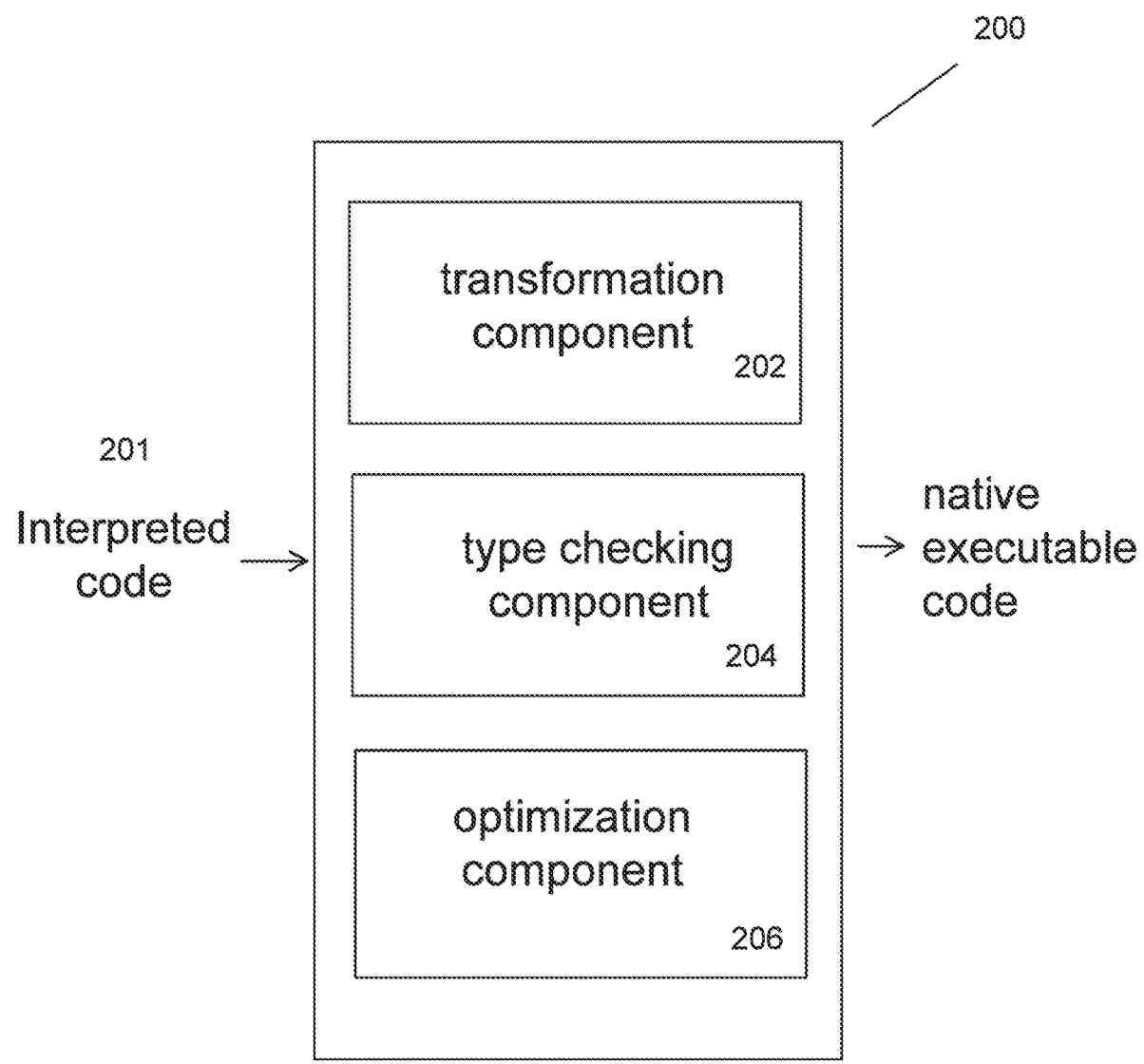
FIG. 2 is a block diagram of compiler system, according to one embodiment.

Shown in FIG. 2 is an example system 200. According to one embodiment, the system 200 can include a transformation component 202 that is configured to accept interpreted code 201 and transform the interpreted code into an AST representation. The AST representation can be passed to a type checking component 204. The type checking component 204 can be configured for static type checking analysis which can yield error detection in the original code 201. In some examples, the system can flag any identified areas or apply additional transformations to resolve improperly typed values. The AST can be returned to the transformation component 202 once type checking has been executed for further transformation. For example, the AST can be transformed into further intermediate representations of the code. The transformation into the intermediate representation produces an output tailored for analysis, transformation, and application of optimizations. Further various compiler optimizations can be applied to the intermediate representation, including, constant folding, dead code elimination, in lining/outlining, and data flow analysis, among other options. In some examples an optimization component can be configured to execute the various optimizations on the intermediate representation.

The optimization component can also be configured to provide language specific optimizations. For example, with Python source the optimization component 206 can be configured to identify code patterns that are inefficient, and replace those inefficient patterns with optimized code. The optimization component 206 can further be configured for domain specific optimizations. An example of a domain specific optimization includes a bioinformatics module that applies various bioinformatics—specific optimizations. In another example the optimization component 206 can be configured to implement parallel processing optimization. According to one embodiment, the system can use a parallel processing back end and tailor optimizations within the intermediate representation to facilitate parallel execution. Once the first intermediate representation has been optimized, the intermediate representation can be converted into another intermediate form. The second IR format can be based on the LLVM format and can leverage optimizations of the LLVM format. For example, the optimization component 206 can be configured to execute LLVM optimizations. In further example, the optimization component can be configured to identify patterns within the LLVM format and tailor the representation accordingly.

Once the transformations and optimizations have been completed the system can output native executable code 209 that can be stored or executed immediately. According to various embodiments the system generates native code that operates with a 100 to 1000 times performance improvement relative to execution of the interpreted code 201.

Example Type Checking Considerations

The inventors have realized that like many dynamic languages, Python checks for type consistency only at runtime. Because virtually every operation in Python—including binary operators, object construction, and even object member accesses—can be expressed as a function call through its magic method mechanism, Python implementations need to verify the existence of the appropriate methods at runtime and ensure that the supplied arguments are consistent with the function signature in order to execute a given operation. This approach—commonly known as duck typing—together with a well-thought-out syntax, allows for rapid prototyping as well as a great deal of flexibility, and has been a large factor in Python's vast popularity across many domains. Unfortunately, this delayed approach to typing is costly, as all method invocations or variable references require expensive dictionary lookups every time a line of code is executed.

Furthermore, type consistency checks are deferred until objects are actually used at runtime, which can sometimes be days after the Python script was initially run. Non-trivial type constraints are also verbose and manual, because the developer must provide them via isinstance- or hasattr-scoped if blocks, and validate them with large test suites to ensure type soundness during execution. Recent versions of Python (3.6 and later) ship with support for type annotations, but still require external tools to perform the actual type checking. Finally, the dynamic nature of Python programs must still allow for ambiguous types (e.g., Any). Since these unknown types must be resolved at runtime, they greatly hinder static typing, and thus overhead-free static compilation to native code—the backbone of Codon's optimization framework.

Various embodiments use ahead-of-time (AOT) compilation to avoid relying on an interpreter, and therefore the compiler needs to know the exact data type and memory layout of each value and expression in a given program. In one example, a type inference algorithm enables inference of types within a Python program at compile time, and compile it to an overhead-free executable. To remedy issues with conventional type inferencing and to cover as much of Python's semantics as possible, various embodiments include a new type system, localized type system with delayed instantiation (LTS-DI). In some examples, LTS-DI improves the classical Hindley-Milner-Damas bidirectional type inference algorithm used in Standard ML (e.g., OCaml, Haskell, etc.) and many other functional languages. LTS-DI includes monomorphization, localized typing, and glues them to a Standard ML-like backend to achieve more comprehensive static type checking of Pythonic code.

In some embodiments, LTS-DI is a bidirectional type system that determines a type for each expression in a given program ahead of time. For example, the inferences executed include parametric polymorphism (which provides support for generic types and functions) and bidirectional type inference (which allows expression types to be decided after the expression has been processed). Similar to a conventional ML type system, each type in a program is either concrete (like int or List[int]), or generic (in other words, parameterized by other types, like List[T] or Optional[T] where T stands for any type). During type inference, Codon maintains a context that maps each type name to known type variables (initialized with basic types such as int, Generator[T] and so on). The presence of generic types necessitates bidirectional type inference if type annotations are not present, as the exact instantiation of a generic type is often not known at declaration time. For example, an empty list declaration x=[ ] has type List[T] where $\tau$ is a currently unknown—or unbound—type variable. $\tau$ can later become resolved once the system adds an element of a known type to the list x. Resolved types are denoted as bound types (e.g., int). For instance, $\tau$ in the previous example will become bound, or unified, to int by x.append (1). An example of unification is given in FIG. 10. Ultimately, the goal of type checking is to realize types in the program, and to report any unrealized type as a compiler error.

With generic functions (functions that have arguments that are either not specified or that are parameterized by a type argument), each unique combination of function argument types will produce a new instantiated function that needs to be type checked separately. This technique, called monomorphization, is used by LTS-DI to instantiate different concrete functions for different argument types (e.g., FIG. 10). However, LTS-DI makes some notable departures and improves over the standard ML type system in order to be compatible with Python's duck typing approach, and includes delayed instantiation, localization, and static evaluation (described in greater detail below).

Delayed instantiation. The complete type of function's body, as well as its return type, will be inferred by the type checking algorithm from the provided argument types at the time of realization, and not at time of definition (recall that Standard ML will infer the most general type of function at the definition time). In other words, LTS-DI will delay the instantiation (and type checking) of a function until all function parameters become bound. This technique, when combined with monomorphization and generic functions (in other words, parametric let-polymorphism), allows LTS-DI to faithfully simulate Python's runtime duck typing at compile time.

Localization. LTS-DI treats each function block as an independent type checking unit with its own typing context. Thus, each function block is locally and independently resolvable by the type system without knowing anything about other blocks' context. For example, FIG. 11, the type of a cannot be inferred from the scope of foo alone, and as such will produce a compiler error. Because the outermost scope is treated as a function itself, the type of a also cannot be inferred from the top-level alone in the bottom snippet of FIG. 11 (the fact that foo can realize a does not help, as each function context is independent of other contexts).

Figure 12:
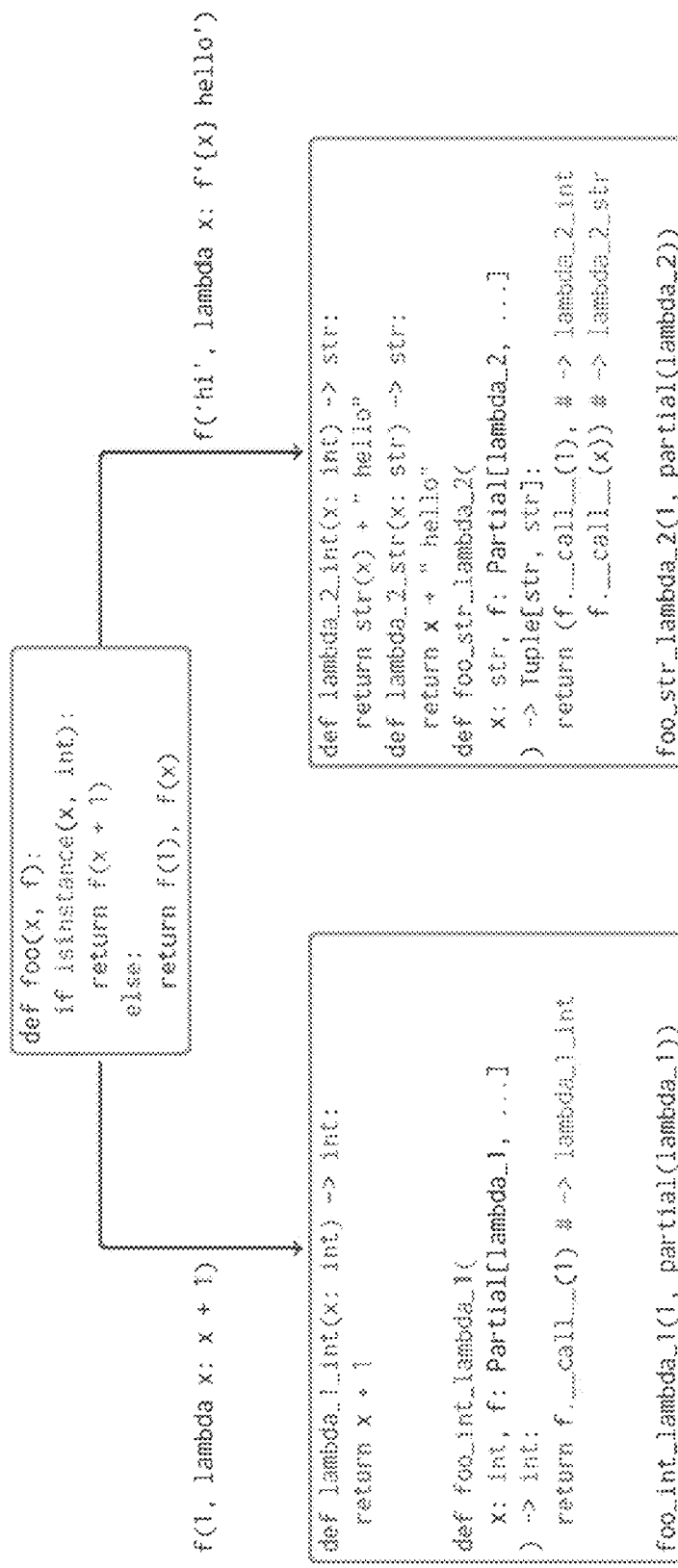
FIG. 12 illustrates an example of monomorphization and static evaluation, according to one embodiment.

Static evaluation. A ML-like type system such as LTS-DI can sometimes over-eagerly reject a valid Python program. For example, a common Python pattern is to dynamically check the type of an expression via isinstance, and to proceed to different blocks of code for different types, often within an if-else statement. A similar strategy is also used in conjunction with hasattr. However, most type checkers will have to check both branches at the same time, and will raise an error if, say, a candidate type does not contain a given method even if the call is guarded by a hasattr check. This behavior stems from the compiler's treating if-conditions as purely runtime constructs and assuming that both branches might get executed, resulting in the type checking of both branches in advance. (Note that Python, on the other hand, does not distinguish between compile time and runtime, and is able to handle these cases gracefully during the latter.) LTS-DI counters this issue by supporting static (compile time) expression evaluation akin to C++'s constexpr expressions. For example, both isinstance and hasattr, as well as many other methods, can and are resolved at compile time. Thus, if an if-statement's condition is a static expression, it will be type checked and compiled only if the expression evaluates to true at compile time. Thus the compiler can opt out of compiling blocks that fail a hasattr check (FIG. 6). 4 Codon also allows static expressions to instantiate types and functions: for example, the n-bit integer type can be expressed as Int[N: Static[int]]. These departures and extensions—or in some cases, restrictions—of Standard ML's type system allow LTS-DI much greater flexibility in dealing with generic functions. Most importantly, LTS-DI treats generic functions as bound types, and instantiates them as unbound types only during their application. In other words, if a generic function is passed as an argument to a function foo, it can be instantiated differently depending on the supplied arguments within the local context of foo, unlike in ML where the first instantiation determines the type of the function variable. A concrete example of this distinction is shown in FIG. 11. FIG. 11 illustrates a program that cannot be type checked by standard Hindley-Milner type inference algorithms, but can by LTS-DI. Since LTS-DI delays function instantiation, it supports multiple applications of f on different argument types, unlike other conventional approaches (e.g., OCaml). These improvements over Standard ML together allow better compatibility with Python, by enabling more general lambda support, as well as support for returning generic functions—this includes the ability to implement Python's decorators (FIG. 12). FIG. 12 illustrates an example of monomorphization and static evaluation in Codon. By combining these two, Codon can support many common Pythonic constructs, like isinstance type checking, generic functions that return different types on different invocations.

Various embodiments are configured to handle special cases of interpreted languages. For example, in Python, all objects are reference objects (effectively pointers), with no distinction between optional and nonoptional references. Various embodiments of LTS-DI support by-value passing and make distinction between optional and non-optional types, the system can automatically promote certain types in a program to Optional as needed, in order to accommodate Python's None construct, and also automatically coerces non-optionals and optionals when needed to maximize compatibility with Python.

Functions. Codon supports partial function creation and manipulation through Python's functools.partial construct or via a new internal ellipsis construct (e.g., f(42, . . . ) is a partial function application with the first argument specified). Each partial function is typed as a named tuple of known arguments, where the names correspond to the original function's. Unlike in ML-like languages, LTS-DI allows functions and partial functions to be generic and thus instantiated multiple times differently. LTS-DI also automatically "partializes" functions that are passed as an argument or returned as a function value, and as such allows passing and returning generic functions that can be instantiated multiple times (e.g., lambdas). By doing so, the system is able to support Python-style decorators that rely on generic function passing and returning. This approach also results in a somewhat higher number of types and instantiations than a Standard ML-like approach; however, duplicate instantiations can be merged later in the compilation pipeline by a LLVM pass, and thereby have no effect on code size. In further embodiments, Codon is configured to supports overloaded methods (e.g., unlike Python).

Miscellaneous considerations. In order to match the behavior of Python, Codon can be configured to process import statements at runtime. This is done by wrapping each import in a function that is called only once by the first statement that reaches it. Codon's LTS-DI also unwraps iterables when needed, and, for example, casts int to float when needed. It also has support for traits, and treats Callable[ . . . ] and Generator[ . . . ] as such. Codon is configured to support Python interoperability and can handle objects managed by the Python runtime via its pyobj interface. Such objects can be automatically wrapped and unwrapped by LTS-DI, depending on the circumstances, in a similar fashion to Optional[T]. As a result, all existing Python modules and libraries (NumPy, SciPy, etc.) are readily usable within Codon.

Environment Specific Optimization Examples

As discussed above, various improvements in execution of the computer system can be achieved by tailoring the compilation pipeline to specific hardware and/or execution environments. According to one example, the compilation pipeline is configured to optimize the resulting native code for execution by a graphics processing unit or GPU. Example code produced from the pipeline is included below.

According to one embodiment, the system includes a GPU application programming interface ("API") configured to implement optimizations tailored to execution of the resulting code on a GPU. In one example, the GPU API is based on, and internally uses, Nvidia's Compute Unified Device Architecture ("CUDA") framework with modification to enable efficient execution and to support interpreted programming languages. For example, the current implementation, unlike CUDA (which is C++-based) enables writing and running GPU kernels from Python code. According to various embodiments, users do not need to be GPU or C++ experts or even familiar with programming in either context. In other examples, unlike existing Python+ GPU solutions, which require C++ code strings to be embedded in Python programs, the system is configured to enable any Python code to run on GPUs—so long as the system can generate the native code output (e.g., 209).

According to some embodiments, the system operates on a number of levels. For example, the system manages source code: where there is the GPU module (i.e. "import gpu" in the code example) that has various functions as well as the "kernel" annotation that can be used to delineate GPU kernels. The delineation is what is used in the actual source code by the programmer. At the AST level, the system is configured to preserve the "gpu.kernel" annotation so the system knows what functions are for the GPU kernels, and this information can be maintained throughout the compilation pipeline. In various embodiments, the system actually generates some new code (e.g., "code" in this stage actually means "AST nodes") for doing automatic to/from GPU conversions. For example, the system generates the "to_gpu" and "from_gpu" (discussed in greater detail below) methods for user-defined classes, allowing the programmer to avoid manually implementing these methods as the system enables them to avoid using low-level GPU driver APIs.

According to further embodiments, the IR (i.e. Codon IR) is where GPU-specific optimizations can be configured to happen. This includes the side effect analysis for determining which kernel arguments are not modified and thus need not be copied back to CPU, as well as the transformation for swapping data types with GPU-optimized versions (and potentially other things we come up with in the future). Any remaining functions/operations can then happen with respect to the LLVM IR, including working with the CPU and GPU modules individually and that whole ensuing pipeline up to generating code. Other implementations can conceivably shuffle these levels and/or operations round (e.g., doing GPU-specific optimizations in LLVM IR) or may not even have their own non-LLVM IRs; the ordering described is an example. Other examples include different ordering and different operations occurring in different order.

Figure 3:
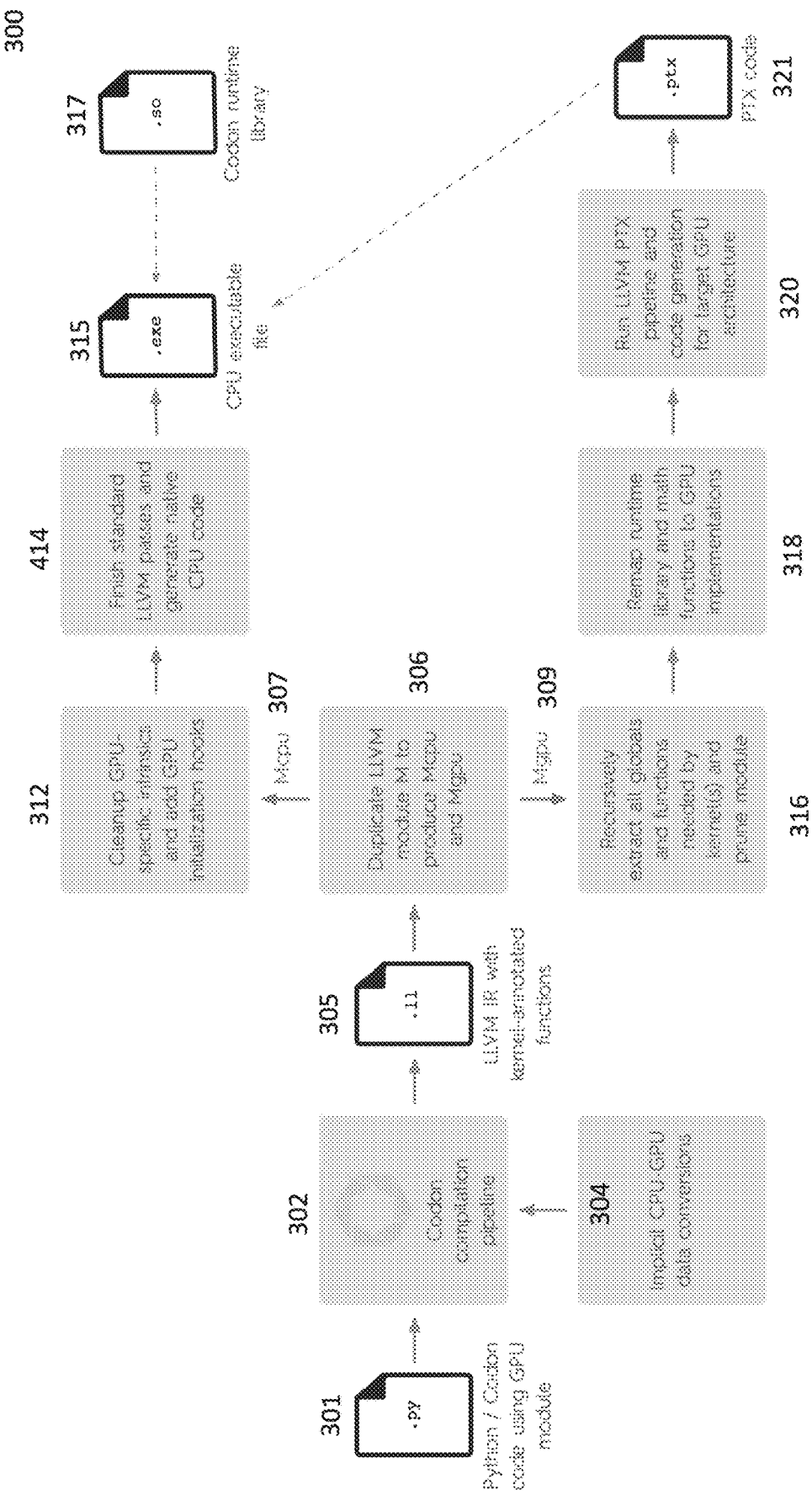
FIG. 3 is an example system and flow, according to one embodiment.

FIG. 3 illustrates an example process 300 for improving execution of interpreted code using a compilation pipeline tailored to include GPU execution. Stated broadly, compiling by the system for GPUs can include generating code for two targets: code for the host CPU (for executing everything before and after the GPU kernel invocation) and code for the GPU itself (for actually executing the GPU kernel). According to one embodiment, the system is configured to partition the LLVM IR (e.g., 305) produced by the compilation process into a CPU component and a GPU component (e.g., at 306). The process 300 as well as what follows in order to generate the code is described below.

At 302 input code (e.g., 301) is processed to produce an LLVM IR module (e.g., 305) containing both CPU and GPU code. Processing at 302 can include execution of a compilation pipeline of FIG. 1. For example, processing at 302 can include generation of an AST, static type checking on the AST, generation of an IR from the AST. Optimizations can be executed on the AST and IR and include pattern identification and reformatting (e.g., for inefficient patterns like repeated concatenation of strings or lists, which is replaced by a more efficient buffer-based approach; or repeated lookups of the same key in a dictionary data structure, which is replaced by a more efficient approach that caches the result of said lookup (as in FIG. 7)), GPU-specific optimizations (e.g., automatically using GPU-optimized data structures), and further transformations to improve execution (e.g., constant folding, dead code elimination, vectorization or other standard compiler optimizations). For example, the optimizations can include language specific optimizations (e.g., Python, Ruby, etc.), domain specific optimizations, backend processing optimizations (e.g., parallel processing), among other options. As part of the compilation into the LLVM IR, process 300 can include implicit CPU-GPU data conversion (e.g., at 304). As shown the data conversions can be processed before executing the compilation pipeline, however, the data conversions can be executed in conjunction with the compilation or merged into a single step, among other options. Various examples are described and detailed in Appendix A.

According to one embodiment, a CPU module can be defined to contain everything needed to interface with the GPU driver. For example, the CPU module can include instructions/definitions for loading generated GPU code and for invoking the GPU kernel. According to one embodiment, the compiler and/or language can also contain an interface to call GPU-specific intrinsic functions. In one example, the "gpu.thread.x" in the example code below returns the x-coordinate of a currently-executing GPU thread, and internally calls a GPU specific function based on the LLVM architecture: "@llvm.nvvm.read.ptx.sreg.tid.x." The above results from operations executed as part of the conversion. For example, the language/GPU library (e.g., "import gpu" in the Mandelbrot code) has an API (e.g., "thread.x") that will be converted to these GPU intrinsics.

GPU Kernel functions are shown in the example code below (e.g., "gpu.kernel" decorator), and are annotated in the resulting LLVM IR (e.g., 305) as part of the compilation at 302-304. The output is an LLVM IR module 305 containing both GPU code and CPU code. In the LLVM IR format, the representation cannot be run on the CPU nor the GPU, until further transformations are applied.

Returning to 304, since the GPU is a physically separate device from the CPU, data needs to be explicitly transferred to and from the GPU from the host application running on the CPU. Conventionally, when programming GPUs in C or C++, this is done through explicit API calls for allocating GPU memory and copying data to and from the GPU (also called the "device" in this context). Various system embodiments, by contrast, are designed to minimize or eliminate these low-level considerations, and perform data conversions automatically. According to some embodiments, the system is configured to employ an API consisting of two functions, for each data type "T":

T.to_gpu(cpu_object): which is configured to allocate GPU memory for a given object, and copy the object's data to the newly allocated GPU memory. The system is configured to assign the same type to the output of this function as that of the input object, although the output is now suitable for use on the GPU.

T.from_gpu(cpu_object, gpu_object): which is configured to copy all the data from "gpu_object" (which is an output of a "to_gpu" call) to "cpu_object" (which is an input to the same "to_gpu" call). On execution, if an object is modified in GPU code, those changes will be reflected for use in the host CPU code after the GPU kernel completes.

According to some embodiments, data conversions are straightforward. For example, with primitive data types like int and float, "to_gpu" returns the value itself and "from_gpu" does not need to perform any transformations. In other examples, objects containing pointers internally (e.g., lists, sets or dictionaries, including Python lists, sets or dictionaries) require allocating memory on the GPU device and performing memory copies.

According to some embodiments, whenever a GPU kernel is invoked, the one or more of the following operations occur:

1. GPU Kernel arguments are converted to GPU objects by invoking the corresponding "to_gpu" methods.
2. The GPU kernel is called via the GPU driver API with the newly created GPU objects.
3. Each GPU object is copied back to the CPU by invoking the corresponding "from_gpu" method.

By managing execution of GPU functions as described, the system is configured to allow any interpreted language type (e.g., Python type, Ruby type, etc.) to be used on the GPU, from primitives like ints and floats to complex data structures such as dictionaries. In some embodiments, further optimizations are applied to improve performance, described in greater detail below.

According to one embodiment, the system can determine if an object is not modified by the GPU kernel. In these circumstances, the object does not need to be copied back to the CPU object via "from_gpu". In some embodiments, the system executes a side effect analysis pass (a standard compiler analysis) during compilation (e.g., 302) on a system IR to determine which kernel arguments are not modified by the GPU kernel, and omit "from_gpu" calls for those arguments. Side effect analysis can be used to determine characteristics of a function—like if it modifies global state, modifies its arguments and so on. For example, f(x)=2x has no side effects, but a function that e.g., modifies elements in a data structure passed to it does. The system can use this analysis to determine what is modified by the GPU code and, hence, what needs to be copied back to the CPU.

According to another embodiment, the system manages the fundamentally different computational characteristics of the GPU compared to CPUs. For example, data structures that are optimized for CPUs often perform poorly on GPUs. Various embodiments are configured to identify certain data types, and swap those data types with GPU-optimized implementations for better GPU performance. For example, if the system swaps CPU type "Tcpu" with GPU type "Tgpu", then the output of "to_gpu" is "Tgpu" and the "gpu_object" input of "from_gpu" has type "Tgpu". Swapping data types as part of the data exchanges employ the APIs of "Tcpu" and "Tgpu," which are identical and result in no code changes being needed in the kernel. For example, the standard Python dictionary type "dict" can be swapped with a GPU-optimized dictionary implementation "gpu_dict" that has all of the functionality of standard "dict" with differing implementation details to e.g., minimize branching (known to be expensive on GPUs). Returning to process 300, once the LLVM IR 305 is produced, the process branches into two: one branch for the CPU module (mcpu 307) and one branch for the GPU module (mgpu 309) at 306 with duplication of the LLVM module. For example, the LLVM module can be the object that contains the LLVM IR. In some examples, the module can correspond to a "translation unit" (i.e. group of files compiled together) in C/C++. According to some embodiments, different transformations are applied to these modules. Initially, these modules are identical to the previously generated LLVM module as they are duplicates.

Following the mcpu branch (e.g., 307), the CPU module is cleaned up so as to remove intrinsics specific to the GPU. For example, GPU intrinsics are replaced with dummy values at 312. In some embodiments, additional code is also generated at the entry point in the code for initializing the GPU drivers and loading whatever code is generated from the GPU module (e.g., at 312). Then, the remainder of the LLVM optimization and code generation pipeline is executed at 314. For example, LLVM passes can be executed at 314 to optimize the CPU specific code, and produce native CPU code (e.g., 315). The generated code at 315 relies on the system's runtime library 317 for interfacing with the GPU driver via a GPU vendor-specific API, such as Nvidia's CUDA driver API. According to some embodiments, the runtime library is configured to call the API(s) given by the GPU vendor. For example, Nvidia GPU's expose an API called the Cuda driver API for managing their GPUs. The runtime library is configured to act as an abstraction to an arbitrary vendor-specific API.

Following the mgpu branch at 309, process 300 continues with pruning the LLVM module. The GPU module initially contains CPU-specific code. At 316, the GPU module can be pruned by extracting the set of functions and global variables that are relied on by the GPU kernel function(s).

According to one embodiment, pruning at 316 can be based on the following recursive algorithm:
1. Initialize an empty set "needed" of functions or global variables needed by the GPU
2. Initialize a worklist "worklist" consisting of just the GPU kernel function(s)
3. If "worklist" is empty, return "needed", otherwise move an element "X" from "worklist" to "needed" under the following conditions:
   a. If "X" is already in "needed", go back to step 3
   b. Add "X" to "needed"
   c. For each function or global variable "Y" referenced by "X", add "Y" to the worklist With the identification of "needed," pruning can proceed on the GPU module to remove everything that is not in the "needed" set. According to various embodiments, the pruning operation (e.g., 316) can be applied multiple times in the pipeline to ensure that the generated GPU code is as minimal as possible.

According to various embodiments, code in the GPU module might refer to functions or LLVM intrinsics that are only applicable to the CPU module. For example, in the sample code below the system computes "abs(z)"—the magnitude of a complex number. Internally, this calls the C function "hypot" on the complex number's real and imaginary components. The "hypot" function is not present for GPU's, however. At 318, the "hypot" reference along with other similar functions are replaced by GPU-compatible equivalents. In some embodiments, the system is configured to leverage the opportunity that the GPU vendor might provide implementations of such functions; for example, Nvidia provides libdevice with GPU-optimized implementations of C math functions. Optionally, the system can determine if a GPU optimized function has been provided (e.g., in a library) and use any provided function, or the system can replace any such function with GPU-compatible equivalents. In various settings, the end result is the ability to seamlessly call math libraries from the source code, and have them work without changes on the GPU.

According to some embodiments, once the GPU module has been pruned, the module is analyzed to remap runtime libraries and math functions to GPU implementations. In some examples, there are three types of remapping.

Named remapping: If, for example, the system has access to a vendor-supplied GPU version of the function to be remapped, the system is configured to rename usages of the function to the name of the vendor-supplied version. For example, "hypot" would become "_nv_hypot" if using libdevice.

Generated remapping: Some functions have no readily available GPU alternative. For such functions, the replacement needs to be generated dynamically. An example is the C function "realloc", which has no counterpart on the GPU. Therefore, the system is configured to generate a "realloc" function emulation by allocating a new block of memory, copying data from the original block to the new block, and freeing the original block.

Null remapping: Some functions are simply not applicable to GPUs. Examples include runtime functions for throwing exceptions. These functions are removed and replaced with "unreachable" directives in LLVM IR, allowing further optimizations (such as dead code elimination) to be subsequently applied.

Once the remapping operations are complete, the system has produced a fully GPU-compatible module. At 320, PTX code is generated from the module. For example, the system can execute a LLVM PTX backend to build the .ptx code (e.g., 321). Once the PTX backend is executed, the generated PTX code can be saved to disk and loaded by the generated CPU executable (from mcpu branch) at startup. After execution of process 300, there are three components that can be used in execution:

CPU executable: Generated from the CPU module; corresponds to original source code excluding GPU kernel(s) (e.g., 315).

GPU PTX code: Generated from the GPU module; corresponds to GPU kernel(s) (e.g., 321).

Runtime shared library: Functions for interfacing with the GPU (e.g., 317).

According to various embodiments, the CPU executable loads the GPU PTX code at startup, and uses the shared library to manage the GPU device, execute kernels, transfer data and so on.

According to various embodiments, process 300 can be executed by a system (e.g., 200), to produce GPU optimized code from interpreted computer language code base. Such a system can execute the steps and/or functions using specialized components or can execute the various functions, steps, and/or algorithms directly. Process 300 is shown as a flow with an ordering, however, other embodiments can combine the steps, execute in different order, omit steps, etc.

Additional embodiments are configured to implement the compilation approach dynamically. For example, the system can optimize interpreted code based interactively through the known Jupyter interface or other similar interfaces. In this implementation, PTX files are generated and loaded dynamically as GPU kernels are defined by the user, and the runtime library is configured to maintain separate contexts for each loaded PTX file, as dictated by the GPU driver API.

Code Example

The system can target code optimization for GPUs and leverage massively parallel computations. The following is example of code produced for computing the Mandelbrot set using GPUs:

```
import gpu        # import GPU module defines functions/interface with
                  GPU
                  # driver (e.g., loading code, invoking kernel, etc.)
MAX = 1000        # maximum Mandelbrot iterations
N   = 4096        # width and height of image
pixels = [0 for _ in range(N * N)]
def scale(x, a, b):
  return a + (x/N)*(b - a)
@gpu.kernel
def mandelbrot(pixels ):
  idx = (gpu.block.x * gpu.block.dim.x) + gpu.thread.x
  # gpu.thread.x interface to call GPU-specific
  # intrinsics
  i, j = divmod(idx, N)
  c = complex(scale(j, -2.00, 0.47), scale(i, -1.12, 1.12)) z = 0j
  iteration = 0
  while abs(z) <= 2 and iteration < MAX: z =
    z**2+c
    iteration += 1
  pixels[idx] = int(255 * iteration/MAX)
mandelbrot(pixels, grid=(N*N)//1024, block=1024)
```

According to one embodiment, plotting the "pixels" array as an image is able to produces the result, and is roughly 450 times faster than running the same code on the CPU:

The above code is shown to illustrate example ways to call GPU-specific intrinsics. In the example code, the GPU kernel (in this case "mandelbrot") is executed by thousands of threads—arranged in fixed "blocks"—and these intrinsics allow the code to determine where it is being executed.

Additional Example Features and Functions

According to another embodiment, Codon enables high-performance DSLs with a flexible development framework that is integrated with an optimized Pythonic base. In some examples, Codon is a full language and a compiler that leverages interpreted language (e.g., Python 3's) syntax and semantics, but compiles to native machine code with low runtime overhead, allowing it to rival C/C++ in performance. To this end, Codon leverages ahead-of-time compilation, specialized bidirectional type checking, and a novel bidirectional intermediate representation (IR) to enable optional domain-specific extensions both in the language's syntax (front-end) and in compiler optimizations (back-end). These features allow not only new DSLs to be seamlessly built on top of the existing Codon framework but also enable different DSLs to be composed within a single program. Because Codon DSLs are built on top of an interpreted language (e.g., Pythonic) base, they benefit from advantages specific to embedded DSLs; on the other hand, their ability to extend the syntax and ship custom compiler passes enables implementation to unlock features typically only accessible to standalone DSLs. In some embodiments, Codon was initially conceived as a limited Pythonic DSL for high-performance scientific computing but has been implemented in other embodiments to provide a language that is highly compatible with interpreted languages (and for example Python 3—one of the most popular programming languages today) in terms of syntax and semantics.

Thus, various embodiments enable programmers to write high-performance code in an intuitive, high-level and familiar manner. Codon embodiments circumvent hurdles of having to learn an entirely new language or ecosystem and allows for substantial code reuse from existing interpreted language (e.g., Python) programs. Unlike other performance-oriented Python implementations that are available conventionally, Codon implementations are built from the ground up as a standalone system that compiles ahead-of-time to a static executable, and in further example, is not tied to an existing Python runtime for execution, as in other conventional approaches. As a result, various embodiments of Codon achieve better performance, and in further examples overcome runtime-specific issues presented in conventional approaches such as the global interpreter lock.

Codon embodiments can be extended to various domains, including bioinformatics, secure multi-party computation, data compression, and parallel programming. Each of these extensions can leverage Codon's compiler infrastructure—from the parser to type checker to intermediate representation—and can implement a performant DSL or library that allows writing high-level interpreted (e.g., Python) code for the target domain. This code nevertheless achieves superior performance relative to conventional offerings due to domain-specific optimizations and transformations.

In some embodiments, any one or more following or any combination of the following can be used in Codon implementation:

Bidirectional IRs. Codon defines a new class of IRs called bidirectional IRs, with which compilation does not follow a linear path after parsing but can return to the type checking stage during IR passes to generate new specialized IR nodes. Examples embodiments demonstrate the utility of bidirectional IRs by using them to implement various optimizations and transformations for several domains (described in greater detail below).

Domain-extensible compiler. Codon includes a domain-extensible compiler via a plugin system, for which domain-specific extensions can be seamlessly implemented and composed in the context of a high-level, dynamic language (Python).

Framework for high-performance, interpreted language (e.g., Pythonic) DSLs. Codon embodiments are implemented and evaluated—for example as a new framework for creating Pythonic DSLs. For example, the framework enables the development of DSLs that share Python's syntax and semantics together with added domain-specific features and IR optimizations. Since example Codon DSLs operate independently of the standard Python runtimes, they can achieve a performance comparable to C while being readily usable by anyone with a knowledge of Python.

According to some embodiments, Codon utilizes static type checking and compiles to LLVM IR that does not use any runtime type information—unlike conventional Python. Codon can be provided with a static bidirectional type system, called LTS-DI, that improves Hindley-Milner (HM)-style inference to deduce the types in a program without requiring the user to manually annotate types (a practice that is, although supported, not widespread among the Python developers). In further embodiments, the system is configured to handle the peculiarities of Python's syntax and common Pythonic idioms and, thus, LTS-DI makes adjustments and improves standard HM-like inference to support notable Python constructs such as comprehensions, iterators, generators (both sending and receiving), complex function manipulation, variable arguments, static type checks (e.g., is instance calls), and more. To handle these constructs and many others, LTS-DI is configured for at least one or more or any combination of the following (1) monomorphization (instantiating a separate version of a function for each combination of input arguments), (2) localization (treating each function as an isolated type checking unit), and (3) delayed instantiation (function instantiations are delayed until all function parameters become known). In further example, the system is configured to process Python constructs that necessitate compile-time expressions (e.g., akin to C++'s constexpr expressions).

To the best of the inventors' knowledge, no system incorporates the joint use of monomorphism and delayed instantiation in the context of type checking interpreted language (e.g., Python) programs. Further embodiments include static implementation and do not perform any runtime type deduction; and as a result, some interpreted language (e.g., Python) features, such as runtime polymorphism or runtime reflection, are not included in various embodiments. In the context of scientific computing, the system is configured to strike a balance between utility and performance by eliminating these features.

Figure 10:
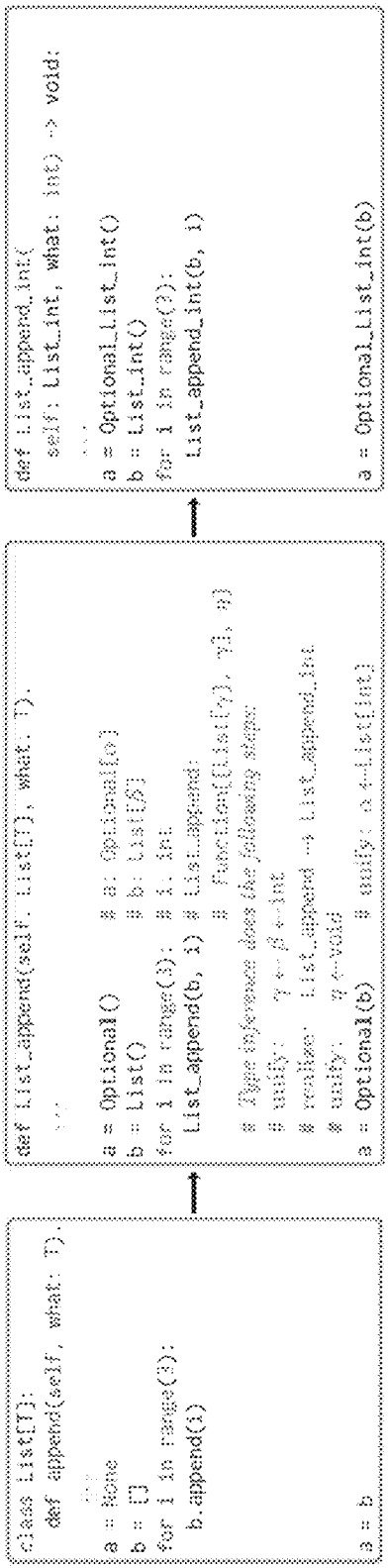
FIG. 10 illustrates an example of type inference and function instantiation, according to one embodiment.

FIG. 10 illustrates an example of type inference and function instantiation. The original code shown on the left gets transformed to the fully type checked version on the right. The middle box shows the first type checking pass and annotates type assignments, unification (type merging) and function realization.

Many languages compile in a relatively direct fashion: source code is parsed into an abstract syntax tree (AST), optimized, and converted into machine code, typically with the help of a framework such as LLVM. Although such approaches are comparatively easy to implement, ASTs often contain many more node types than necessary to represent a given program. Conventionally, this complexity can make implementing optimizations, transformations, and analyses difficult or even impractical.

According to various embodiments, a Codon Intermediate Representation (CIR) is implemented that is radically simpler than an AST, with both a simpler structure and fewer node types (see e.g., FIG. 16). Despite this simplicity, embodiments of CIR maintain most of the source's semantic information and facilitate "progressive lowering," enabling optimization at multiple levels of abstraction. Optimizations that are more convenient at a given level of abstraction are able to proceed before further lowering.

Figure 5:
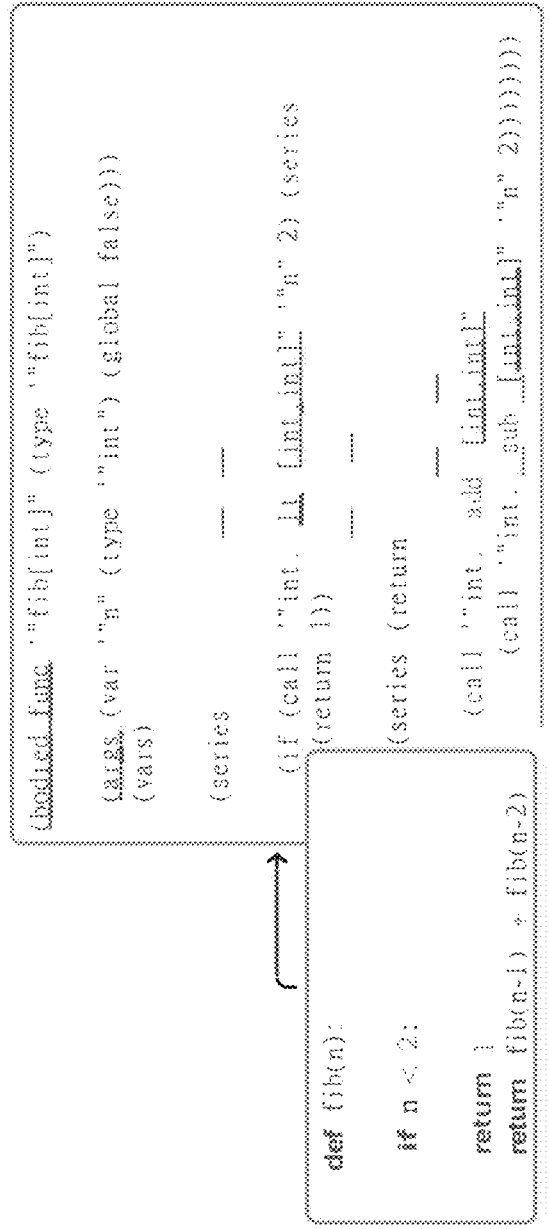
FIG. 5 is an example source code mapping to CIR, according to one embodiment.

In some embodiments, the system defines a CIR that is a value-based IR. As in LLVM, the system defines a structure similar to single static assignment (SSA) form, making a distinction between values, which are assigned at one location, and variables, which are conceptually similar to memory locations and can be modified repeatedly. For example, to minor the source's structure, values can be nested into arbitrarily-large trees. Keeping this SSA-like tree structure enables easy lowering at the Codon IR level. For example, this structure enables CIR to be lowered to a control flow graph easily. Unlike conventional approaches (e.g., LLVM), CIR initially represents control flow using explicit nodes called flows, allowing for a close structural correspondence with the source code. For example, this makes optimizations and transformations that depend on precise notions of control flow much easier to implement. A simple example is a for flow that keeps explicit loops in CIR and allows Codon to easily recognize patterns such as the common for x in range(y) loop instead of having to decipher a maze of branches, as is done in lower-level IRs like LLVM IR. An example of source code mapping to CIR is shown in FIG. 5.

In some examples, Codon's compilation pipeline proceeds at first in a linear fashion, where source code is parsed into an abstract syntax tree (AST), on which type checking is performed to generate an intermediate representation (IR). Unlike other compilation frameworks, however, Codon's is bidirectional, and IR optimizations can return to the type checking stage to generate new IR nodes and specializations not found in the original program, which enables optimizations not available in conventional approaches. The framework is "domain-extensible", and a "DSL plugin" can include library modules, syntax, and domain-specific optimizations.

According to some embodiments, CIR does not represent operators like+explicitly but instead converts them to corresponding function calls (also known as "magic methods" in the Python world). For example, the +operator resolves to an add call (FIG. 5). In further embodiments, this enables seamless operator overloading for arbitrary types via magic methods, the semantics of which are identical to Python's.

A natural question that arises from this approach is how to implement operators for primitive types like int and float. In some examples, Codon solves this by allowing inline LLVM IR via the @llvm function annotation, which enables all primitive operators to be written in Codon source code. Information about operator properties like commutativity and associativity can be passed as annotations in the IR.

Traditional compilation pipelines are linear in their data flow: source code is parsed into an AST, usually converted to an IR, optimized, and finally converted to machine code. Codon implementation improves over such approach and introduces, for example, the concept of a bidirectional IR, wherein IR passes are able to return to Codon's type checking stage to generate new IR nodes and specializations not present in the source program. At least one and any combination of the following benefits can be realized:

Large portions of complex IR transformations can be implemented directly in Codon. For example, the prefetch optimization mentioned below involves a generic dynamic coroutine scheduler that is impractical to implement purely in Codon IR.

New instantiations of user-defined data types can be generated on demand. For example, an optimization that requires the use of Codon dictionaries can instantiate the Dict type for the appropriate key and value types. Instantiating types or functions is a non-trivial process that requires a full re-invocation of the type checker due to cascading realizations and specializations.

The IR can take full advantage of Codon's high-level type system. By the same token, IR passes can themselves be generic, using Codon's expressive type system to operate on a variety of types.

While CIR's type system is very similar to examples described in Codon, CIR types can be fully realized and have no associated generics (unlike Codon/AST types). However, in various examples every CIR type carries a reference to the AST types used to generate it, along with any AST generic type parameters. These associated AST types that can be used when reinvoking the type checker which allow CIR types to be queried for their underlying generics, even though generics are not present in the CIR type system (e.g., the system enables obtaining the type T from a given CIR type representing List[T], and to even use it to realize new types or functions). Note that CIR types correspond to high-level Codon types; in contrast LLVM IR types are more low-level and do not map back directly to Codon types.

The ability to instantiate new types during CIR passes can be leveraged in many CIR operations. For example, creating a tuple (x, y) from given CIR values x and y requires instantiating a new tuple type Tuple[X,Y] (where the uppercase identifiers indicate types), which in turn requires instantiating new tuple operators for equality and inequality checking, iteration, hashing and so on. Calling back to the type checker makes this a seamless process, however.

In further embodiments, CIR provides a comprehensive analysis and transformation infrastructure: wherein users write passes using various CIR built-in utility classes and register them with a PassManager, which is configured to manage scheduling execution and ensures that any required analyses are present.

Figure 6:
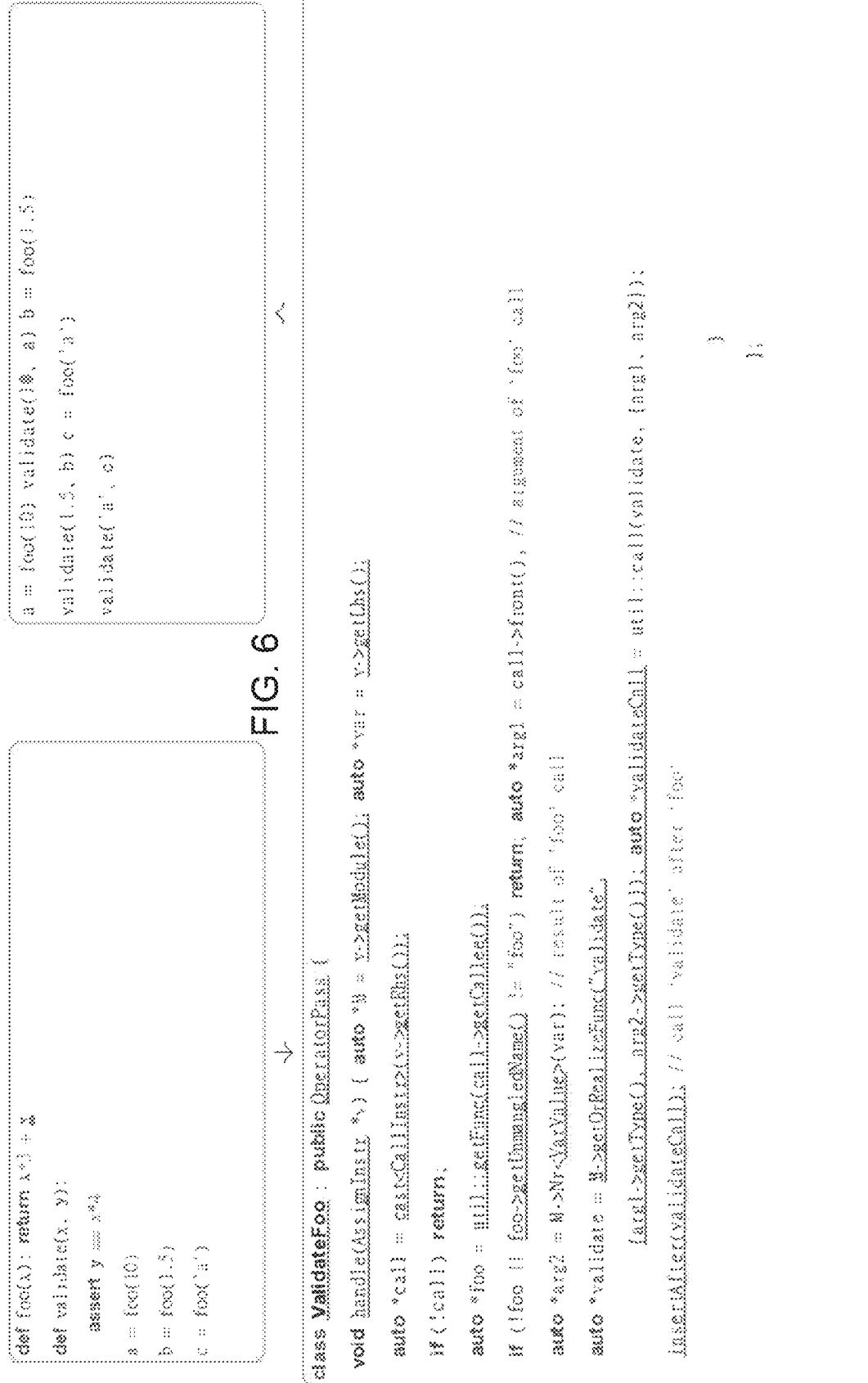
FIG. 6 is an example source code mapping to CIR, according to one embodiment.

In other embodiments, more complex passes can make use of CIR's bidirectionality and re-invoke the type checker to obtain new CIR types, functions, and methods, an example of which is shown in FIG. 6. In this example, calls of the function foo are searched for, and a call to validate on foo's argument and its output is inserted after each. As both functions are generic, the type checker is re-invoked to generate three new, unique validate instantiations. Instantiating new types and functions can include handling possible specializations and realizing other nodes (e.g., the ==operator method—eq—can be realized in the process of realizing validate in the example), as well as caching realizations for later use.

In various embodiments, Codon is configured to use LLVM to generate native code. The conversion from Codon IR to LLVM IR can include intuitive examples: int becomes i64, float becomes double, bool becomes i8 and so on—these conversions also allow for C/C++ interoperability. Tuple types can be converted to structure types containing the appropriate element types, which are passed by value (e.g., re-call that tuples are immutable in Python); such approaches for handling tuples allows LLVM to optimize them out entirely in most cases. Reference types like List, Dict etc. can be implemented as dynamically-allocated objects that are passed by reference, which follows Python's semantics for mutable types. In various examples, Codon is configured to manage None values by promoting types to Optional as necessary; where optional types are implemented via a tuple of LLVM's i1 type and the underlying type, where the former indicates whether the optional contains a value. For example, optionals on reference types are specialized to use a null pointer to indicate a missing value.

In further embodiments, generators are a prevalent language construct in Python; for-loops iterate over a generator (e.g., for i in range(10) iterates over the range(10) generator). Generators in Codon are configured to carry no extra overhead and compile to equivalent code as standard C for-loops in various embodiments. To this end, Codon can be configured to employ LLVM coroutines to implement generators. LLVM's coroutine passes elide coroutine overhead (such as frame allocation) and inline the coroutine iteration whenever the coroutine is created and destroyed in the same function. (In other examples the original LLVM coroutine passes which rely on explicit "create" and "destroy" intrinsics—can be used but are not optimal when deciding to elide coroutines generated by Codon, so in various embodiments of Codon's LLVM fork this process is replaced with a capture analysis of the coroutine handle, and is able to elide coroutine overhead in nearly all real-world cases.)

Codon can be configured to use a small runtime library when executing code. In one example, the known Boehm garbage collector—a drop-in replacement for malloc—can be used to manage allocated memory (and in other examples can employ other memory management solutions), and OpenMP for handling parallelism. In some embodiments, Codon is configured to offer multiple compilation modes: including, for example, debug and release. Debug mode includes full debugging information, allowing Codon programs to be debugged with tools like GDB and LLDB, and also include full backtrace information with file names and line numbers. In further embodiments, release mode is configured to perform a greater number of optimizations (including -O3 optimizations from GCC/Clang) and omits some safety and debug information. Users can therefore use the debug mode for quick programming and debugging cycle and the release mode for high-performance deployment.

Various system embodiments leverage the framework's flexibility and bidirectional IR, as well as the overall expressiveness of Python's syntax, to defer a large fraction of the DSL implementation effort. Indeed, described in further detail below, Codon applications typically implement large fractions of their domain-specific components in the source itself. This provides the benefit of making Codon DSLs intrinsically interoperable—in various embodiments, so long as their standard libraries compile, disparate DSLs can be used together seamlessly. Along these lines, the defines a modular approach for incorporating new IR passes and syntax, which can be packaged as dynamic libraries and Codon source files. At compile time, the Codon compiler can load the plugin, registering the DSL's elements.

Some conventional approaches allow customization for all facets of an IR. In various embodiments of the Codon IR, the system is configured to restrict customization to a few types of nodes, and instead leverages bidirectionality for further flexibility. Such implementation improves over known approaches and for example, allows users to derive from "custom" types, flows, constants, and instructions, which interact with the rest of the framework through a declarative interface. According to one example, custom nodes derive from the appropriate custom base class (CustomType, CustomFlow, etc.) and expose a "builder" to construct the corresponding LLVM IR. Implementing custom types and nodes can include defining a Builder that specifies LLVM IR generation via virtual methods (e.g., buildType); the custom type class itself defines a method getBuilder to obtain an instance of this builder. This standardization of nodes can be configured to enable DSL constructs to work seamlessly with existing passes and analyses.

Figure 7:
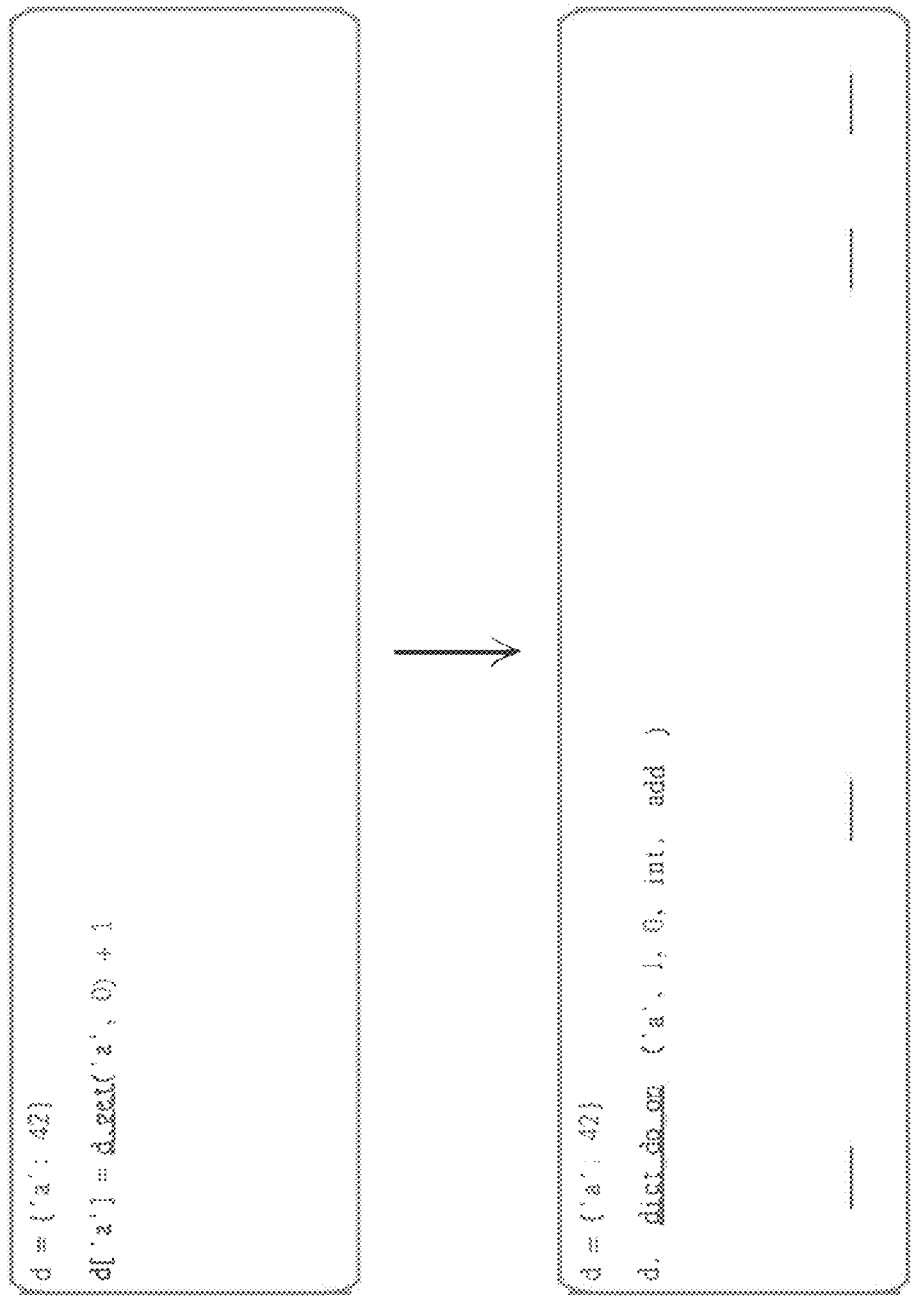
FIG. 7 is an example of dictionary optimization, according to one embodiment.

As discussed, given Codon's roots in Python, it can substantially accelerate many standard Python programs out of the box thanks to AOT compilation. For example, Codon IR makes it easy to optimize several patterns commonly found in Python code, such as dictionary updates (that can be optimized to use a single lookup instead of two; FIG. 7), or consecutive string additions (that can be folded into a single join to reduce allocation overhead).

FIG. 7 shows an example of dictionary optimization. The pass recognizes the get/set pattern and replaces it with a single call to dict_do_op. As this function is generic, the system is configured to instantiate a new version and pass the int. add function as a parameter. This optimization results in a 12% performance improvement on a wordcount benchmark.

Figure 8:
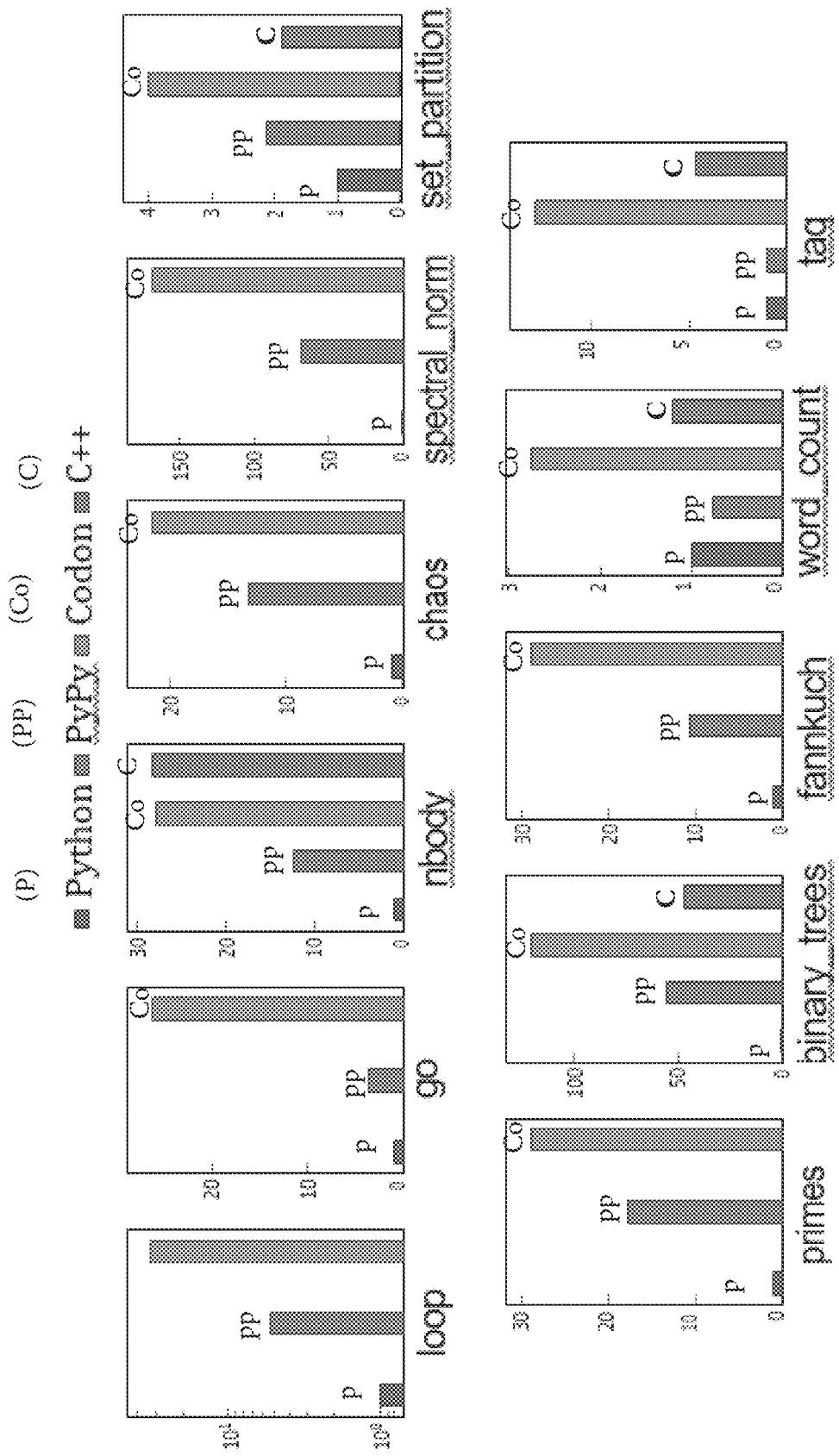
FIG. 8 illustrates runtime performance and comparisons, according to one embodiment.

Other example benchmarks are illustrated that show the extent of Codon's performance improvements. FIG. 8 shows Codon's runtime performance, as well as that of CPython (v3.10) and PyPy (v7.3), on the pybenchmark benchmark suite restricted to a set of "core" benchmarks that do not rely on external libraries such as Django or DocUtils.

While Codon can use existing Python libraries through a CPython bridge, their performance will be equal to that of CPython. In the benchmark analysis, Codon is always faster, sometimes by orders of magnitude when compared to CPython and PyPy. For some benchmarks, example implementation is provided to corresponding C++ implementations and observed that Codon provides similar—if not improved—performance. These benchmarks were done on an arm64 (Apple M1 Max) machine with 64 GB of RAM running macOS 12.5.1, and on x86-64 (64-core Intel Xeon Gold 5218) machine with 754 GB of RAM running CentOS 7, with CPython 3.10.8, 3.8.2, PyPy 7.3.9, Clang 13.0.1 and Codon 0.15

Because various embodiments of Codon are built from the ground up independently of the existing Python runtimes, Codon implementation does not suffer from CPython's infamous global interpreter lock, or other failings of conventional approaches, and can therefore take full advantage of multi-threading. According to some embodiments, the system can be configured to implement a Codon extension that allows end-users to use OpenMP within Codon itself to support parallel programming. An example OpenMP program in C++ and Codon is shown in FIG. 9, exhibiting Codon's ability to extend the syntax of the base Python language and its ability to implement complex transformations needed to interface with OpenMP. OpenMP predominately leverages outlining to parallelize code—in general, a parallel loop's body is outlined into a new function, which is then called by multiple threads by the OpenMP runtime. For example, the body of the loop from FIG. 9 is outlined to a function f that takes as parameters the variables a, b, c and the loop variable i.

Then, a call to f is inserted into a new function g that invokes OpenMP's dynamic loop scheduling routines for a chunk size of 10. Finally, g would be called by all threads in the team via OpenMP's fork_call function. The result is shown in the right snippet of FIG. 9 (note that for simplicity, this code omits a few details like the loop schedule code and thread or location identifiers). The executed passes also take care to handle private variables (e.g., local to the out-lined function), as well as shared ones (details omitted for brevity). Reductions over variables also require additional code generation for atomic operations (or the use of locks), as well as an additional layer of OpenMP API calls.

The bidirectional compilation is leveraged by Codon's OpenMP pass. The various loop "templates" (e.g., dynamic loop scheduling routines in the example above, or static and task-based loop routines) can be implemented in high-level Codon source code. Following the code analysis, the reduction pass copies and specializes these "templates" by filling in the loop body, chunk size and schedule, rewriting expressions that rely on shared variables, and more. This design simplifies the pass implementation and adds a degree of generality (e.g., it is easy to implement new templates and strategies directly in Codon for new types of loops without having to redesign the pass itself). Unlike conventional approaches (e.g., Clang or GCC, etc.), Codon's OpenMP pass deduces which variables are shared, which are private, as well as any reductions taking place (e.g., a +=i within the loop body would generate code for a +-reduction on a). Custom reductions can also be implemented simply by providing an appropriate atomic magic method (e.g., atomic_add) on the reduction type. In further example, Codon also employs several lowering passes that lower certain for-loops that iterate over a generator (the default behavior of Python loops) to "imperative loops"—C-style loops with a start, stop, and step values. For example, for i in range(N) will be lowered to an imperative loop with start index 0, stop index N, and step 1; iterations over lists will also be lowered to imperative loops. Imperative loops are, in turn, converted into OpenMP parallel loops if the @par tag is present. Non-imperative parallel loops are parallelized by spawning a new OpenMP task for each loop iteration and placing a synchronization point after the loop. For example, this approach allows all Python for-loops to be parallelized. OpenMP transformations are implemented as a set of CIR passes that match the for loops marked by the @par attribute (a syntactic extension provided by the Codon parser) and transform such loops into the appropriate OpenMP construct within CIR. Nearly all OpenMP constructs can be implemented as higher-order functions in Codon itself.

System Examples

The following examples illustrate various functions of a system for compiling interpreted language code. The various examples can be discussed with respect to a Codon implementation of functional elements of the system and/or Codon implementation.

As a real-world, non-trivial example, consider the code snippet shown in FIG. 13 that uses LTS-DI as its type system. The flatten function takes an arbitrary collection and recursively flattens its contained elements to generate the noncollection elements. Hence, the print statement on the last line displays [1, 2, 3, 4, 5, 6]—the inner elements of v that are neither lists nor tuples. Executing this function in standard Python is relatively straightforward, as all type information is deferred until runtime. In a statically-typed context, however, the situation is substantially more complicated and requires the combined use of several of LTS-DI's features. In particular, LTS-DI's static evaluation will choose the correct branch of the if-statement at compile time, and different instantiations of flatten can be generated for the different data types present in the tuple v—these instantiations will then recursively invoke one another to produce the correct result. Although this example at first appears out of reach for static type checking, the features employed by LTS-DI—particularly monomorphization and static evaluation—make it tractable.

In another example, consider the code in FIG. 14. Here, the group function takes an iterator of key-value pairs and groups them into a dictionary mapping keys to lists of values. The invocation of group on the last line instantiates the function for argument type List[Tuple [str, int]]; within group itself are two collections of unknown types:

The groups variable of type Dict[Tk,Tv] for unknown key and value types Tk and Tv, respectively.

The empty list [ ] used in the setdefault method call of type List[Te] for unknown element type Te.

This example illustrates LTS-DI's bidirectionality operation when dealing with collections whose types cannot be deduced immediately. In particular, this snippet contains two collections whose element types are non-trivially intertwined, but which LTS-DI is able to resolve nonetheless.

Figure 15:
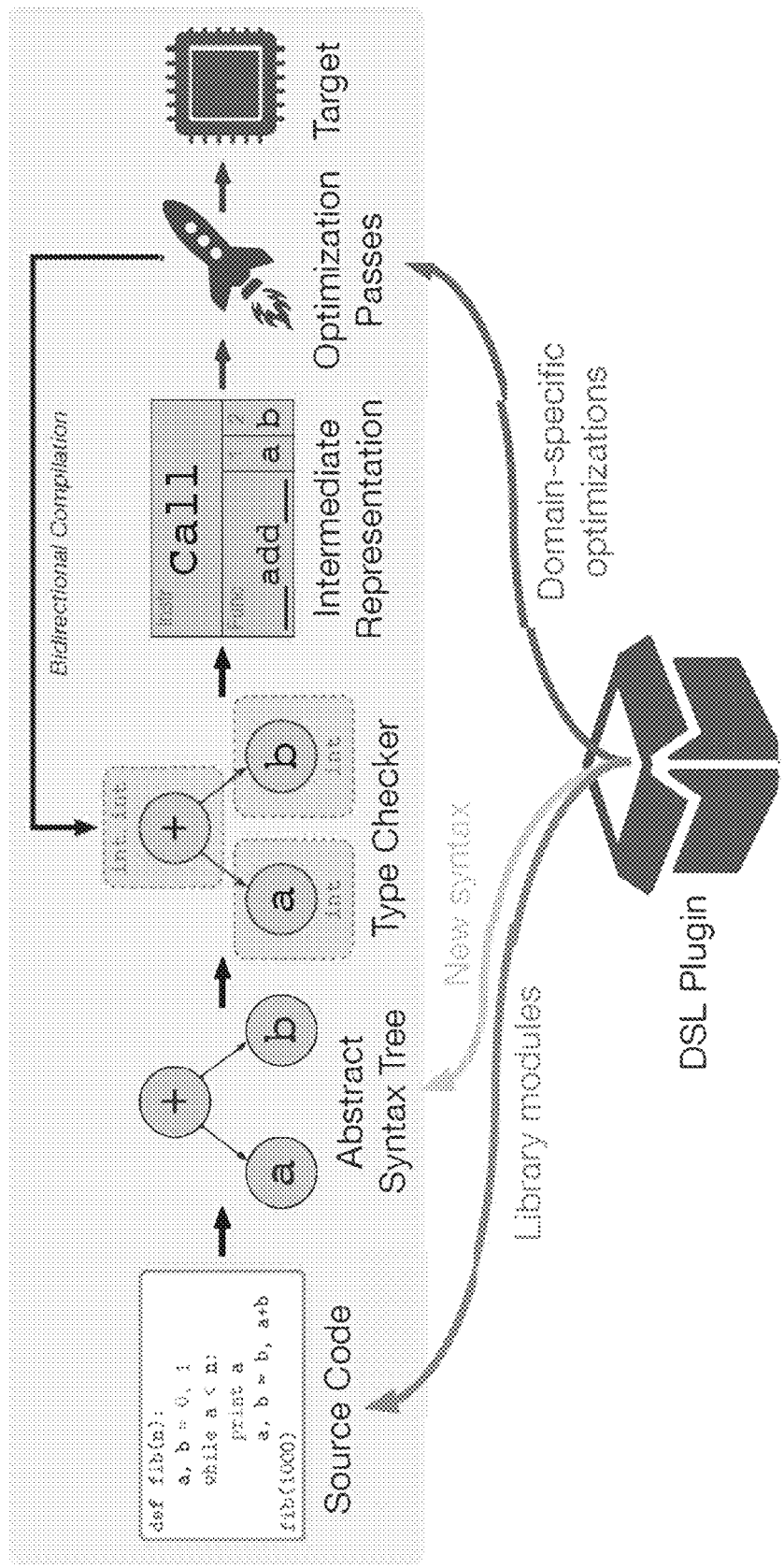
FIG. 15 illustrates an example compilation pipeline flow, according to one embodiment.

In various embodiments, Codon implements an approach for converting an AST into an intermediate representation (IR) prior to performing optimization passes. IRs typically contain a substantially reduced set of nodes with well-defined semantics, making them much more conducive to transformations and optimizations. An example of this approach, which is positioned between the type checking and optimization phases, is shown in FIG. 15. FIG. 15 illustrates Codon's compilation pipeline. Compilation proceeds at first in a linear fashion, where source code is parsed into an abstract syntax tree (AST), on which type checking is performed to generate an intermediate representation (IR). Unlike other compilation frameworks, however, Codon's is bidirectional, and IR optimizations can return to the type checking stage to generate new IR nodes and specializations not found in the original program, which is required for several key optimizations we present in this work. The framework is "domain-extensible", and a "DSL plugin" consists of library modules, syntax extensions, and domain-specific IR passes.

In further example, the Codon Intermediate Representation (CIR—Table 1) is radically simpler than conventional AST, with both a simpler structure and fewer nodes. Despite this simplicity, CIR maintains most of the source's semantic information and facilitates "progressive lowering," enabling optimization at multiple layers of abstraction.

Optimizations that are more convenient at a given layer of abstraction are able to proceed before further lowering. An example listing of CIR's structure can be found in Table 1—FIG. 16 and FIG. 17. Various system embodiments employ a structure similar to single static assignment (SSA) form, while making a distinction between values, which are assigned once, and variables, which are conceptually similar to memory locations and can be modified repeatedly. So as to minor the source's structure, values can be nested into arbitrarily-large trees. Keeping this SSA-like tree structure enables easy lowering at the Codon IR level. For example, this structure enables CIR to be lowered to a control-flow graph easily. Unlike LLVM, however, the IR initially represents control flow using explicit nodes called flows, allowing for a close structural correspondence with the source code. Representing the control-flow hierarchy explicitly enables optimizations and transformations that depend on precise notions of control-flow much easier to implement. One example is the for flow: in Pythonic languages, the for x in range(y) pattern is exceedingly common; maintaining explicit loops allows Codon to easily recognize this pattern rather than having to decipher a maze of branches, as is done in lower-level IRs like LLVM IR.

Figures 17, 18:
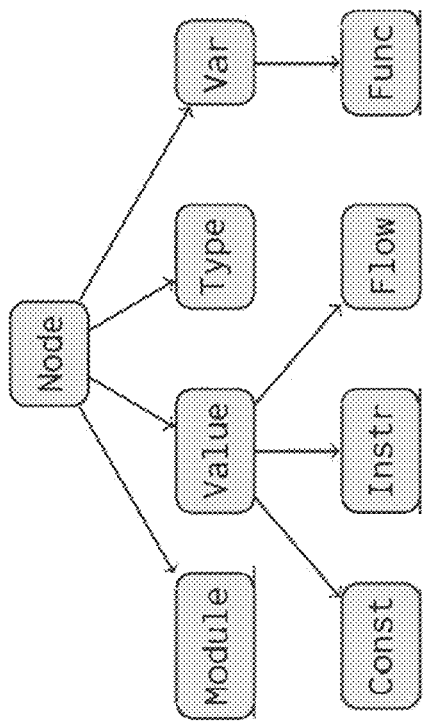
FIG. 17 is an example listing of data structure elements, according to one embodiment.
FIG. 18 shows an example application of inline function annotation, according to one embodiment.

In some embodiments, CIR does not represent operators like+, -, etc. explicitly, but instead converts them to function calls resembling Python's "magic methods". For example, the +operator resolves to an _add_call. This enables seamless operator overloading for arbitrary types via these magic methods, the semantics of which are identical to Python's. A natural question that arises from this approach is how to implement operators for primitive types like int and float. Codon solves this by allowing inline LLVM IR via the @llvm function annotation, which enables all primitive operators to be written in Codon source code. An example for int. add (int) is shown in FIG. 18. Information about operator properties like commutativity and associativity can be passed as annotations in the IR.

Traditional compilation pipelines are linear in their data flow: source code is parsed into an AST, usually converted to an IR, optimized, and finally converted to machine code. With Codon, operation includes the concept of a bidirectional IR, wherein IR passes are able to return to the type checking stage to generate new IR nodes and specializations not present in the source program. Among the benefits of a bidirectional IR are:

Large portions of complex IR optimizations can be implemented in Codon. For example, the prefetch optimization mentioned herein involves a generic dynamic scheduler of coroutines that is impractical to implement purely in IR.

New instantiations of user- or library-defined data types can be generated on demand. For example, an optimization that requires the use of Codon/Python dictionaries can instantiate the Dict type for the appropriate key and value types. Instantiating types or functions is a non-trivial process that requires a full re-invocation of the type checker due to cascading realizations, specializations and so on.

The IR can take full advantage of Codon's intricate type system. By the same token, IR passes can themselves be generic, using Codon's expressive type system to operate on a variety of types.

While CIR's type system is very similar to Codon's, CIR types are fully realized and have no associated generics (unlike Codon/AST types). However, every CIR type carries a reference to the AST types used to generate it, along with any AST generic type parameters. These associated AST types are used when re-invoking the type checker, and allow CIR types to be queried for their underlying generics, even though generics are not present in the CIR type system (e.g., it is straightforward to obtain the type T from a given CIR type representing List[T], and even use it to realize new types or functions). The ability to instantiate new types during CIR passes improves many CIR operations. For example, creating a tuple (x, y) from given CIR values x and y can involve instantiating a new tuple type Tuple[X,Y] (where the uppercase identifiers indicate types), which in turn includes instantiating new tuple operators for equality and inequality checking, iteration, hashing and so on. Calling back to the type checker makes this a seamless process, however.

In various embodiments, implementing bidirectionality within a given IR requires a degree of integration with the AST and type checker. For example, the type checker employs the host language's type system when type checking the AST, whereas the IR's type system might be significantly different. Codon's IR, for example, has no concept of generic types, whereas generics are used extensively during type checking. To address this issue, all CIR types carry a reference to the corresponding AST type that was used to generate them; this AST type is used when interfacing with the type checker. Furthermore, new IR types are always created via the type checker, ensuring they all carry a corresponding AST type reference. Several domain specific features are described to illustrate bidirectional IR features.

FIG. 19 shows an example of Codon source mapping into CIR. The simple function fib (Fibonacci sequence) maps to a CIR BodiedFunc with a single integer argument. The body contains an IfFlow that either returns a constant or recursively calls the function to obtain the result. Notice that operators like + and − are converted to function calls (_add_ and _sub_, respectively), but that the IR otherwise mirrors the original source code in its structure, allowing easy pattern matching and transformations.

In some embodiments, CIR provides a comprehensive analysis and transformation infrastructure: users write passes using various CIR built in utility classes and register them with a PassManager, which can be responsible for scheduling execution and ensuring that any required analyses are present. In FIG. 20, a simple addition constant folding optimization that utilizes the OperatorPass helper is shown. The utility pass visits each node in an IR module automatically. In this case, the operations override the handler for CallInstr, check to see if the function matches the criteria for replacement, and perform the action if so (recall that binary operators in CIR are expressed as function calls). In further implementation, users can also define their own traversal schemes and modify the IR structure at will. More complex passes can make use of CIR's bidirectionality and re-invoke the type checker to obtain new CIR types, functions, and methods, an example of which is shown in FIG. 21.

In this example, calls of the function foo are searched for, and a call to validate on foo's argument and its output is inserted after each. As both functions are generic, the type checker is re-invoked to generate three new, unique validate instantiations. Instantiating new types and functions requires handling possible specializations and realizing other types and functions (e.g., the ==operator method_eq_must be realized in the process of realizing validate in the example), as well as caching realizations for future use to avoid a blowup in code size.

In various embodiments. Codon uses LLVM to generate native code. The conversion from Codon IR to LLVM IR is generally a straightforward process, following the mappings listed in Table 1. Most Codon types also translate to LLVM IR types intuitively: int becomes i64, float becomes double, bool becomes i8 and so on—these conversions also allow for C/C++ interoperability. Tuple types can be converted to structure types containing the appropriate element types, which are passed by value (recall that tuples are immutable in Python); this approach for handling tuples allows LLVM to optimize them out entirely in most cases. In further example, reference types like List, Dict etc. are implemented as dynamically-allocated objects that are passed by reference, which follows Python's semantics for mutable types. Codon is configured to handle None values by promoting types to Optional as necessary; optional types are implemented via a tuple of LLVM's i 1 type and the underlying type, where the former indicates whether the optional contains a value. Optionals on reference types can be specialized so as to use a null pointer to indicate a missing value.

Generators are a prevalent language construct in Python; in fact, every for loop iterates over a generator (e.g., for i in range(10) iterates over the range(10) generator). Hence, Codon is configured to manage generators to carry no extra overhead, and compile to equivalent code as standard C for-loops whenever possible. In one example, Codon uses LLVM coroutines to implement generators. LLVM's coroutine passes elide all coroutine overhead (such as frame allocation) and inline the coroutine iteration whenever the coroutine is created and destroyed in the same function. In some examples, testing showed that the original LLVM coroutine passes which rely on explicit "create" and "destroy" intrinsics—were too strict when deciding to elide coroutines, so Codon improves this operation: in Codon's LLVM fork this process is replaced with a capture analysis of the coroutine handle, which is able to elide coroutine overhead.

According to some embodiments, Codon uses a small runtime library when executing code. In particular, the Boehm garbage collector—a drop-in replacement for malloc—can be used to manage allocated memory, in addition to OpenMP for handling parallelism and libbacktrace for exception handling. To improve operation, Codon offers two compilation modes: debug and release. Debug mode includes full debugging information, allowing Codon programs to be debugged with tools like GDB and LLDB, and also includes full backtrace information with file names and line numbers. Release mode performs a greater number of optimizations (including standard −O3 optimizations from GCC/Clang) and omits debug information. Users can therefore use debug mode for a seamless programming and debugging cycle, and use release mode for high-performance in deployment.

Due to the framework's flexibility and bidirectional IR, as well as the overall expressiveness of Python's syntax, a large fraction of the DSL implementation effort can be deferred to implementation of the Codon source. Codon applications typically implement large fractions of their domain-specific components in the source itself. This has the benefit of making Codon DSLs intrinsically interoperable—so long as their standard libraries compile, disparate DSLs can be used together seamlessly. Along these lines, the system is configured for a modular approach for incorporating new IR passes and syntax, which can be packaged as dynamic libraries and Codon source files. At compile time, the Codon compiler can load the plugin, registering the DSL's elements. Many frameworks like MLIR allow customization for all facets of the IR. While this allows for a great deal of flexibility, it also comes at the cost of complexity when implementing new patterns, analyses, and transformations. Due to Codon's fully-featured base, embodiments restrict customization of the IR to a few types of nodes, ensuring compatibility with existing CIR infrastructure, all the while maintaining flexibility. In particular, OR allows users to derive from "custom" types, flows, constants, and instructions, which interact with the rest of the framework through a declarative interface. For example, custom nodes derive from the appropriate custom base class (CustomType, CustomFlow, etc.) and expose a "builder" to construct the corresponding LLVM IR. An example of the API is shown in FIG. 22, which implements a 32-bit float (note that Codon's default float type is 64-bit). Implementing custom types (and custom nodes in general) can involve defining a Builder that specifies LLVM IR generation via virtual methods (e.g., buildType and buildDebugType); the custom type class itself defines a method getBuilder to obtain an instance of this builder. According to various embodiments, standardization of nodes enables DSL constructs to work seamlessly with existing passes and analyses.

LTS-DI type checking algorithms operate on a localized block (or list) of statements that in practice represents either a function body or top-level code (excluding function or class constructs). LTS-DI's typing algorithm can provide a loop that continually runs the type checking procedure on expressions whose types are still not completely known, until either all types become known or no changes can be made (the latter case implies a type checking error, often due to a lack of type annotations). Multiple iterations can be necessary because types of later expressions are often dependent on the types of earlier expressions within a block, due to dynamic instantiation (e.g., x=H; z=type(x); x.append (1); z( )). Type checking of literals is straightforward, as the type of a literal is given by the literal itself (e.g., 42 is an int, 3.14 is a float, etc.). Almost all other expressions—binary operations, member functions, constructors, index operations and so on—can be transformed into a call expression that invokes a suitable magic method (e.g., a+b becomes a._add_(b)). Each call expression is type checked only if all of its arguments are known in advance and fully realized. Once they are realized, the algorithm recursively type checks the body of the function with the given input type argument types, and in practice caches the result for later uses. Call expression type checking will also attempt to apply expression transformations if an argument type does not match the method signature, an example of which is unwrapping Optional arguments. References to other functions are passed not as realized functions themselves (as often the system cannot know the exact realization at the time of calling), but instead as temporary named function types (or partial function types, if needed) that point to the passed function. This temporary type is considered to be "realized" in order to satisfy LTS-DI's requirements. FIGS. 23 and 24 provide examples of a formal characterization of the algorithm, that highlight differences with the standard Hindley-Milner type checking algorithm.

The examples shown in FIGS. 23-24 uses the following example notations and definitions:

Each function F is defined to be a list of statements coupled with argument type $F_1^{arg}, \ldots F_n^{arg}$ and a return type $F^{ret}$ Each statement is defined to be a set of expressions $e_1, \ldots, e_m$. Each expression e has a type $e_{type}$—the goal of type checking is to ascertain these types.

All types are either realized (meaning they are known definitively) or unrealized (meaning they are partially or completely unknown). For example, int is a realized type, List[T] is only partially realized as T is a generic type, and T itself is completely unrealized. Let Realized (t) denote whether type t is fully realized.

Some expressions are returned from a function and thus used to infer the function's return type. Let Returned(e) denote whether expression e is returned.

Let UnrealizedType( ) return a new, unrealized type instance.

Unification is the process by which two types are forced to be equivalent. If both types are realized, both must refer to the same concrete type or a type checking error will occur. Partially realized types are recursively unified; for example, unifying List[T] and List[float] results in the generic type T being realized as float. Let Unify($t_1$, $t_2$) denote this operation for types $t_1$ and $t_2$.

Define an expression transformation to be a function ξ: E→E that converts one expression into another, where E is the set of expressions. LTS-DI employs a set of expression transformations X to handle various aspects of Python's syntax and semantics, such as what is described in above with respect to type checking.

According to one embodiment, the LTS-DI algorithm is primarily based on two subroutines that recursively call one another. Firstly, LTSDI(F) (Algorithm 1—FIG. 23) takes a function F and assigns realized types to each expression contained within, or reports an error if unable to do so. This procedure continually iterates over the contained expressions, attempting to type check each that has an unrealized type. If no expression types are modified during a given iteration, a type checking error is reported. Otherwise, if all expression types are realized, the procedure terminates. Secondly, TypeCheck(e) performs type checking for the individual expression e. Since this process predominantly entails type checking call-expressions, Algorithm 2 (FIG. 24) outlines the algorithm specifically for such expressions. Each argument is first recursively type checked, after which the types of the argument expressions are unified with the function's argument types. If unification fails, expression transformations are applied in an effort to reach a successful unification; if none is encountered, an error is reported. At the end, if all argument expression types are realized, the function body is recursively type checked by again invoking LTSDI.

Figure 4:
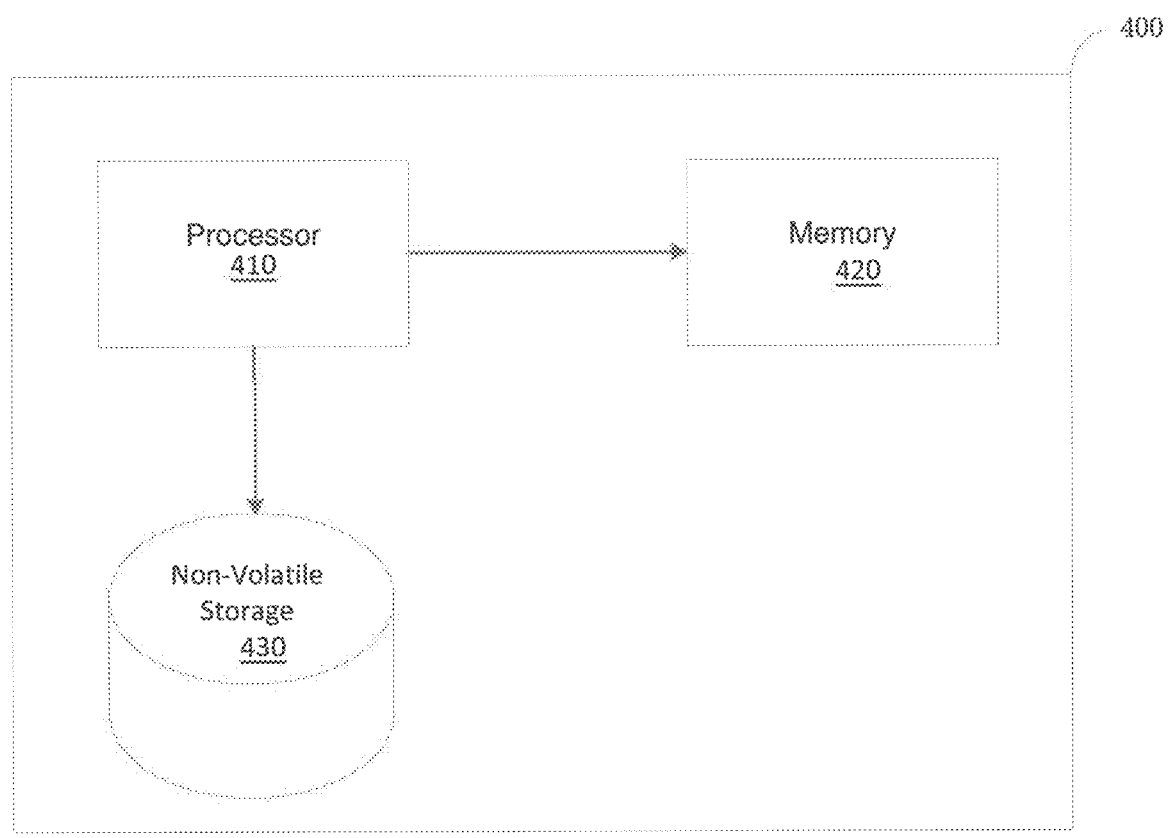
FIG. 4 is a block diagram of an example special purpose computer system improved by the functions and/or processes disclosed herein.

Additionally, an illustrative implementation of a special purpose computer system 400 that may be specially programmed to be used in connection with any of the embodiments of the disclosure provided herein is shown in FIG. 4. The computer system 400 may include one or more processors 410 and one or more articles of manufacture that comprise non-transitory computer-readable storage media (e.g., memory 420 and one or more non-volatile storage media 430). The processor 410 may control writing data to and reading data from the memory 420 and the non-volatile storage device 430 in any suitable manner. To perform any of the functionality described herein (e.g., secure execution, proxied execution, sandboxed execution, etc.), the processor 410 may execute one or more processor-executable instructions stored in one or more non-transitory computer-readable storage media (e.g., the memory 420), which may serve as non-transitory computer-readable storage media storing processor-executable instructions for execution by the processor 410.

The terms "program" or "software" or "app" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed:

1. A system for compiling interpreted language code, the system comprising:
   at least one processor;
   a memory operatively coupled to the at least one processor;
   the at least one processor when executing configured to:
      accept interpreted language ("IL") code;
      transform the IL code into a first representation, the first representation comprising an abstract syntax tree;
      validate data type specification in the IL code;
      transform the first representation into an intermediate representation ("IR") in response to validation;
      optimize the IR based on backend specific optimizations, wherein the backend specific optimizations include hardware specific optimization targets,
      wherein the interpreted code is Python based, and the at least one processor is configured to:
      construct a representation of Python code;
      partition the representation of the Python code in order to generate machine code for multiple heterogeneous targets, including a central processing unit ("CPU"), and at least one other target selected from a GPU, FPGA, and TPU;
      transform the intermediate representation into a low level virtual machine intermediate representation ("LLVM IR"); and
      convert the LLVM IR into an executable comprising compiled code including operations to generate the executable for running on the CPU, a shared library referenced by the executable for interfacing the CPU with the at least one other target, and code specific to the at least one other target.

2. The system of claim 1, wherein at least one processor is further configured to optimize the IR based on at least one of: interpreted language optimizations or domain-specific optimizations.

3. The system of claim 2, wherein the hardware specific optimization targets include optimizing the executable for running on a graphics processing unit, field programmable gate array, or tensor processing unit.

4. The system of claim 3, wherein the system is further configured to construct a central processing unit ("CPU") specific code representation and a hardware specific code representation from the LLVM IR.

5. The system of claim 4, wherein the system is further configured to generate the hardware specific code representation based on executing operations configured to remove CPU specific operations.

6. The system of claim 4, wherein the system is further configured to generate the hardware specific code representation based on executing operations to remap functions specified in the IL code into GPU functions.

7. The system of claim 1, wherein the at least one processor is configured to preserve concepts from the IL code including control-flow information in the intermediate representation.

8. The system of claim 7, wherein the at least one processor is configured to define explicit nodes for encoding control flow information.

9. The system of claim 1, wherein the at least one processor is configured to match patterns defined in the IR and automatically update any code matching the pattern.

10. The system of claim 1, wherein the at least one processor is configured to execute localized type system with delayed instantiation as part of the transformations of interpreted language code.

11. A method for compiling interpreted language code, the method comprising:
  accepting, by at least one processor, interpreted language ("IL") code;
  transforming, by the at least one processor, the IL code into a first representation, the first representation comprising an abstract syntax tree;
  validating, by the at least one processor, data type specification in the IL code;
  transforming, by the at least one processor, the first representation into an intermediate representation ("IR") in response to validation;
  optimizing, by the at least one processor, the IR based on backend specific optimizations, wherein the backend specific optimizations include hardware specific optimization targets;
  wherein the interpreted code is Python based, and the method further comprises:
    constructing a representation of Python code, and
      partition the representation of the Python code in order to generate machine code for multiple heterogeneous targets, including a central processing unit ("CPU"), and at least one other target selected from a GPU, FPGA, and TPU;
  transforming, by the at least one processor, the intermediate representation into a low level virtual machine intermediate representation ("LLVM IR"); and
  converting, by the at least one processor, the LLVM IR into an executable comprising compiled code, wherein the act of converting includes generating the executable for running on the CPU, a shared library referenced by the executable for interfacing the CPU with the at least one other target, and code specific to the at least one other target.

12. The method of claim 11, wherein optimizing the IR is based on at least one of: interpreted language optimizations or domain-specific optimizations.

13. The method of claim 12, wherein the hardware specific optimization targets include optimizing the executable for running on a graphics processing unit, field programmable gate array, or tensor processing unit.

14. The method of claim 13, wherein the method further comprises constructing a central processing unit ("CPU") specific code representation and a hardware specific code representation from the LLVM IR.

15. The method of claim 14, wherein the method further comprises generating the hardware specific code representation based on executing operations configured to remove CPU specific operations.

16. The method of claim 14, wherein the method further comprises generating the hardware specific code representation based on executing operations to remap functions specified in the IL code into GPU functions.

17. The method of claim 11, wherein the method further comprises preserving concepts defined in the IL code, including control-flow information with the intermediate representation.

18. The method of claim 17, wherein the method further comprises defining explicit nodes for encoding control flow information.

19. The method of claim 11, wherein the method further comprises matching patterns defined in the IR and automatically updating any code matching the pattern.

20. The method of claim 11, wherein the method further comprises executing localized type system with delayed instantiation as part of the transformations of interpreted language code.

* * * * *